US012738290B2

(12) United States Patent
Jones et al.

(10) Patent No.: US 12,738,290 B2
(45) Date of Patent: Sep. 15, 2026

(54) SYSTEMS AND METHODS FOR ACOUSTIC ECHO CANCELLATION FOR AUDIO PLAYBACK DEVICES

(71) Applicant: Sonos, Inc., Santa Barbara, CA (US)

(72) Inventors: Aaron Jones, Santa Barbara, CA (US); Saeed Bagheri Sereshki, Goleta, CA (US)

(73) Assignee: Sonos, Inc., Goleta, CA (US)

( * ) Notice: Subject to any disclaimer, the term of this patent is extended or adjusted under 35 U.S.C. 154(b) by 63 days.

(21) Appl. No.: 18/561,028

(22) PCT Filed: May 20, 2022

(86) PCT No.: PCT/US2022/072465
§ 371 (c)(1),
(2) Date: Nov. 15, 2023

(87) PCT Pub. No.: WO2022/246463
PCT Pub. Date: Nov. 24, 2022

(65) Prior Publication Data

US 2024/0257821 A1 Aug. 1, 2024

Related U.S. Application Data

(60) Provisional application No. 63/201,986, filed on May 21, 2021, provisional application No. 63/201,988, filed on May 21, 2021.

(51) Int. Cl.
*G10L 21/0216* (2013.01)
*G10L 25/84* (2013.01)
(Continued)

(52) U.S. Cl.
CPC .......... *G10L 21/0216* (2013.01); *G10L 25/84* (2013.01); *H04R 27/00* (2013.01); (Continued)

(58) Field of Classification Search
CPC .............. H04R 27/00; H04R 2227/009; H04R 2227/005; G10L 25/84; G10L 21/0216;
(Continued)

(56) References Cited

U.S. PATENT DOCUMENTS 5,440,644 A 8/1995 Farinelli et al.
5,590,241 A * 12/1996 Park ........................ G10L 15/20 704/226

(Continued)

FOREIGN PATENT DOCUMENTS

CN 103259563 A 8/2013
EP 1389853 A1 2/2004

(Continued)

OTHER PUBLICATIONS

AudioTron Quick Start Guide, Version 1.0, Mar. 2001, 24 pages.

(Continued)

*Primary Examiner* — Kile O Blair
(74) *Attorney, Agent, or Firm* — Fortem IP LLP

(57) ABSTRACT

Systems and methods for improved acoustic echo cancellation and convergence state detection are disclosed. An adaptive filter of a network microphone device (NMD) can be used to generate a filter output to be applied to microphone input signals for echo cancellation. The filter output can be generated using a reference signal corresponding to source audio content played back via transducers of the NMD. The adaptive filter can be updated dynamically over time based at least in part on an adaptation parameter that determines the rate of adaptation. In response to determining that a reset event has occurred, the adaptation parameter can be reset to a default value. Additionally or alternatively, in response to detecting a convergence error, the adaptation parameter can be reset to a default value.

20 Claims, 13 Drawing Sheets

(51) Int. Cl.
*H04R 27/00* (2006.01)
*G10L 21/0208* (2013.01)

(52) U.S. Cl.
CPC ............... *G10L 2021/02082* (2013.01); *H04R 2227/005* (2013.01); *H04R 2227/009* (2013.01)

(58) Field of Classification Search
CPC ............... G10L 15/08; G10L 2015/088; G10L 2021/02082; G10L 21/0208
See application file for complete search history.

(56) References Cited

U.S. PATENT DOCUMENTS

| | | | |
|---|---|---|---|
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2009/0123002 | A1 | 5/2009 | Karthik et al. |
| 2017/0103775 | A1* | 4/2017 | Xu ......................... H04R 3/005 |
| 2017/0208170 | A1 | 7/2017 | Mani et al. |
| 2019/0096398 | A1* | 3/2019 | Sereshki ............. G10L 21/0208 |
| 2020/0091963 | A1 | 3/2020 | Christoph et al. |

FOREIGN PATENT DOCUMENTS

| | | | |
|---|---|---|---|
| WO | 0016497 | A1 | 3/2000 |
| WO | 200153994 | | 7/2001 |
| WO | 2003093950 | A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D M Holdings*, Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability, mailed on Nov. 30, 2023, issued in connection with International Application No. PCT/US2022/072465, filed on May 20, 2022, 11 pages.

* cited by examiner

SYSTEMS AND METHODS FOR ACOUSTIC ECHO CANCELLATION FOR AUDIO PLAYBACK DEVICES

CROSS-REFERENCE TO RELATED APPLICATIONS

This application is a 371 national phase of International Application No. PCT/US2022/072465, filed May 20, 2022, which claims priority to U.S. Patent Application No. 63/201,986, filed May 21, 2021, and U.S. Patent Application No. 63/201,988, filed May 21, 2021, which are incorporated herein by reference in their entireties.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1A:
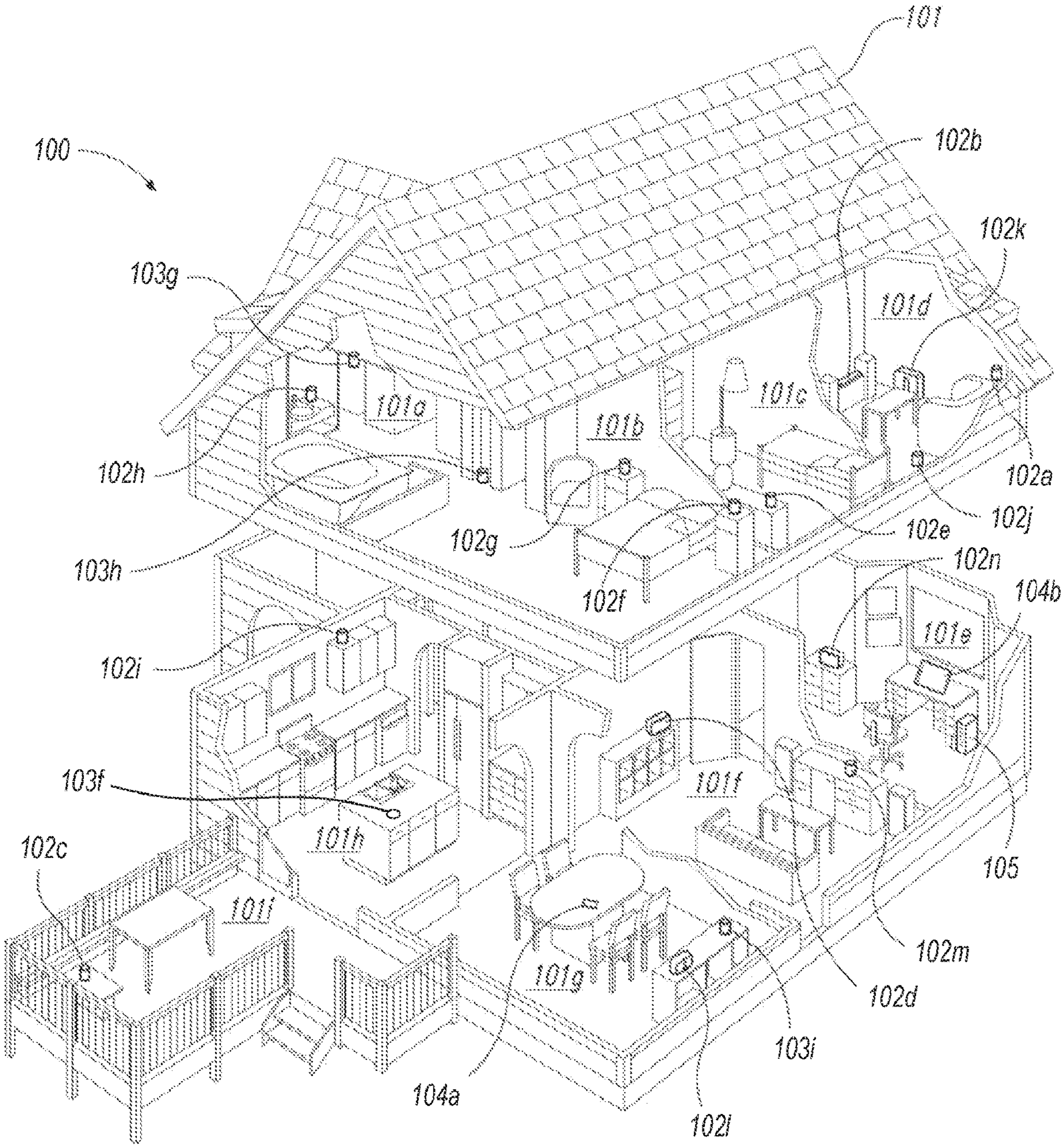
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate voice-assistant service (VAS) for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In some instances, a user may issue vocal commands when the NMD is already playing back audio, and the microphones may capture audio that corresponds to both the user's vocal commands and the audio output by the NMD. In such circumstances, the audio that is output by the NMD may comprise "noise" that can obscure the user's vocal command to the NMD.

To address these and other problems, acoustic echo cancellation can be performed on the captured signal to filter out the reflected output of the audio played back by the NMD, thereby increasing the signal-to-noise ratio of the signal captured by the microphones. Essentially, the acoustic echo cancellation process removes the unwanted audio played by the NMD from the audio signal captured by the microphones, thereby enhancing the clarity of the voice command on the captured audio.

The particular signal processing required to perform acoustic echo cancellation depends on the surrounding environment. For example, audio played back by a transducer of the NMD may follow many acoustic paths before being detected via microphones of the NMD. There may be a direct reflected path off a far wall, another path that bounces off the ceiling and floor before returning to the microphones of the NMD, and yet another path that bounces off a nearby shelf. Each path may have different physical length resulting in different time delays between the audio transducer and the microphones. As the sound travels through the environment and bounces off surfaces, it is attenuated and/or absorbed. As such, the sound that arrives at the microphones of the NMD is the combination or these various delayed and attenuated copies of the original audio output.

Acoustic echo cancellation involves applying an impulse response filter to the incoming audio signals detected via the microphones. The impulse response of this filter approximates the acoustic transfer from the audio source (e.g., the audio transducer of the NMD) to the microphones of the NMD. This is commonly referred to as the room impulse response because it varies as a function of the surrounding environment. Because both the output audio and the environment may change (e.g., more people may enter the room, the NMD may be moved, etc.), the impulse response filter is generally an adaptive filter that dynamically changes in response to detected changes in the audio output and/or the detected signals.

In operation, the output of the adaptive filter is a signal that mimics the signal at the input to the microphones of the NMD. If the mimicry is very close, then after subtracting the adaptive filter output from the microphone input signal, the residual energy from audio transducer playback should be near zero. This difference is called the error signal, and reflects the remaining audio signal of interest (e.g., the user's voice input). The adaptive filter can be dynamically updated by adjusting parameters of the filter to optimize its performance. This can involve, for example, adjusting parameters until the error signal and the reference signal (the signal used to drive the audio transducer) are as uncorrelated as possible, and the error signal is as near zero as possible. When this occurs, the filter is said to have "converged" to the room impulse response.

In the context of an NMD configured to process periodic voice inputs from a user, it is desirable to achieve a rapid convergence time. This may be particularly true as the first words of the user's voice input may be a wake word, which must be recognized by a wake word engine of the NMD to trigger appropriate downstream processing. As such, if the convergence time is too great (e.g., 1 second or more), the wake word may not be recognized in the user's voice input and the user will be required to repeat the wake word before issuing the desired commands. To avoid the frustration of the user in such cases, the acoustic echo cancellation process can be configured to achieve a rapid convergence time (e.g., less than 1 second, less than about 0.5 seconds, etc.).

In some examples, the adaptive filter can include a variable adaptation parameter that determines a magnitude of change in the adaptive filter from one iteration to the next (e.g., the adaptive filter can iterate with each subsequent frame of input data, and the adaptation parameter can limit a magnitude of change the adaptive filter output from one iteration to the next). By using a larger adaptation parameter, the adaptive filter can update more quickly. However, a smaller adaptation parameter can allow for more fine-tuned adjustments that lead to better performance of the adaptive filter (e.g., less correlation between the reference signal and the filter output, and/or lower error signal). To address this trade-off between convergence speed and performance, the adaptive filter can be configured to vary the adaptation parameter over time. For example, at an initial state, the adaptation parameter can have an initial or default value, and this value can decrease over time in a manner that allows for initially large changes in the adaptive filter to achieve convergence or near-convergence in a short period of time, with the magnitude of changes decreasing over time to allow for more fine-tuned adjustments.

As described in greater detail below, in some examples it can be useful to "reset" the adaptation parameter to a greater value (e.g., a default value) in response to detection of a reset event. For example, in the case of a portable NMD, a determination that the device has been moved may be a reset event. Because movement of the device will affect the room impulse response and therefore the adaptive filter performance, it can be beneficial to reset the adaptation parameter to a larger or default value following this detection of movement. Other examples of reset events include detecting the presence of one or more users in the environment (e.g., using microphone input data, received signal strength indicator (RSSI) information, or other such user localization techniques), detection of motion in the environment, a power-on event, or a user-provided input (e.g., a user can indicate via a control device such as a smartphone that microphone performance is poor, in which case the adaptation parameter can be reset).

In addition or alternatively to resetting the adaptation parameter in response to a reset event, the adaptation parameter can be varied dynamically in response to a convergence state determination. As described in more detail below, a convergence state of the adaptive filter can be determined by monitoring the reference signal, error signal, and/or the microphone input signals to determine whether the adaptive filter has achieved convergence. If the convergence state detection process determines that the adaptive filter is in a state of convergence error (e.g., convergence is taking too long), then the adaptation parameter can be increased or at least limited from further decreases. If, in contrast, the convergence state detection process determines that the adaptive filter has reached convergence, then the adaptation parameter can be reduced or at least not prohibited from further decreases.

In various examples, the convergence state detection process can include calculating various correlations: an autocorrelation of the frequency-domain reference signal, an autocorrelation of the frequency-domain filter output, and a cross-correlation of the reference signal and the filter output. These three correlations can then be combined to output a single convergence state value (e.g., a correlation coefficient having a normalized value between 0 and 1, with values nearer to 0 indicating convergence and values closer to 1 indicating residual echo and lack of convergence). A threshold can be applied (e.g., values below 0.4 indicating convergence), and a counter can be used to determine if a convergence state has been achieved (e.g., threshold must be exceeded for a predetermined time period or number of frames). By using such correlations to evaluate an acoustic echo cancellation convergence state, the adaptive filter can be modified in real-time using a variable adaptation parameter that responds dynamically to the real-time performance of the adaptive filter. This can achieve both rapid initial convergence of the adaptive filter as well as allowing for more fine-tuned adjustments to the adaptive filter to improve overall performance.

While some examples described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
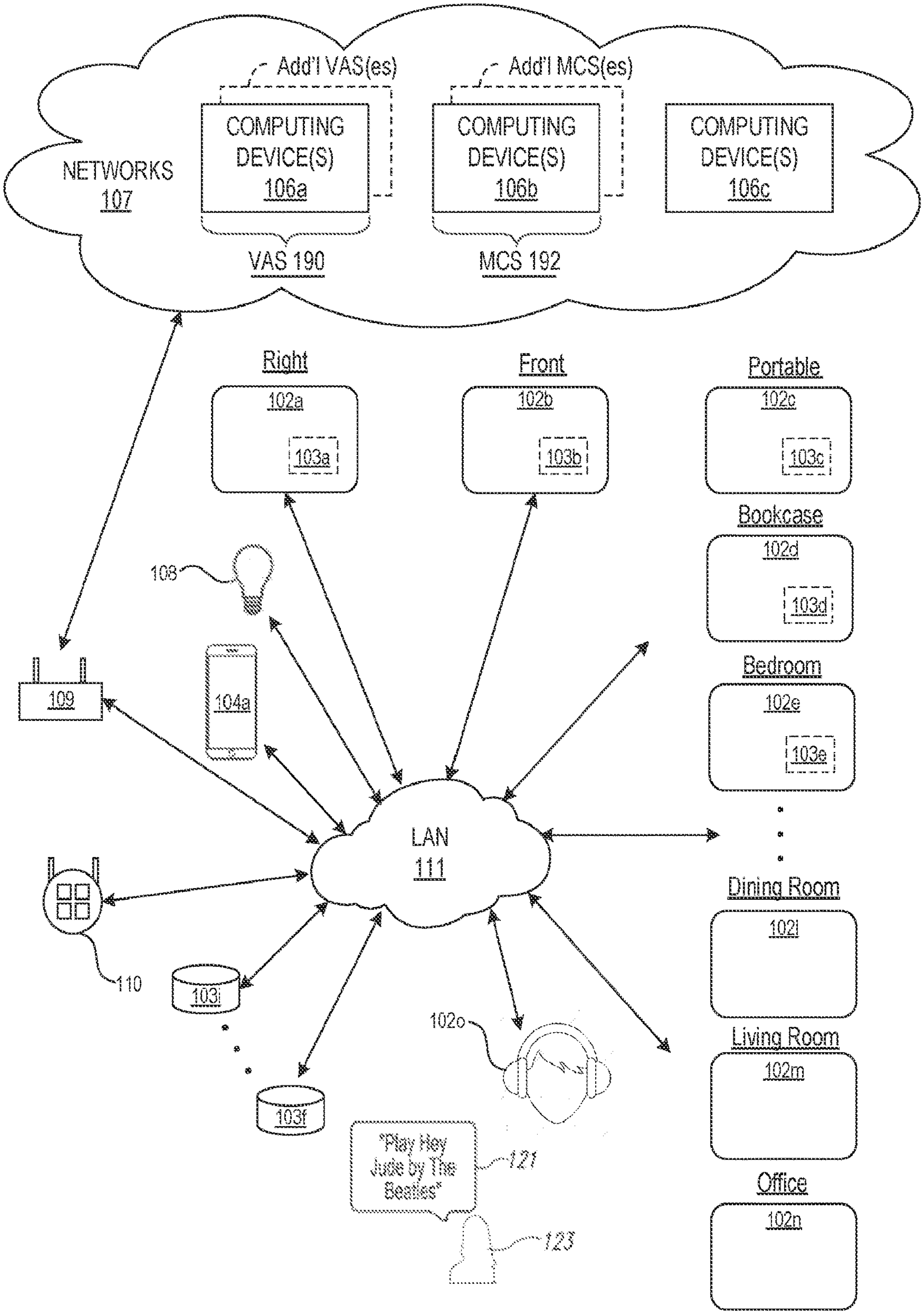
FIG. 1B is a schematic diagram of the media playback system of FIG. 1A and one or more networks.

FIGS. 1A and 1B illustrate an example configuration of a media playback system 100 (or "MPS 100") in which one or more examples disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In examples described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related example, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some examples, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a*-*e* include or are otherwise equipped with corresponding NMDs 103*a*-*e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some examples, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a*-*d*. In some examples, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
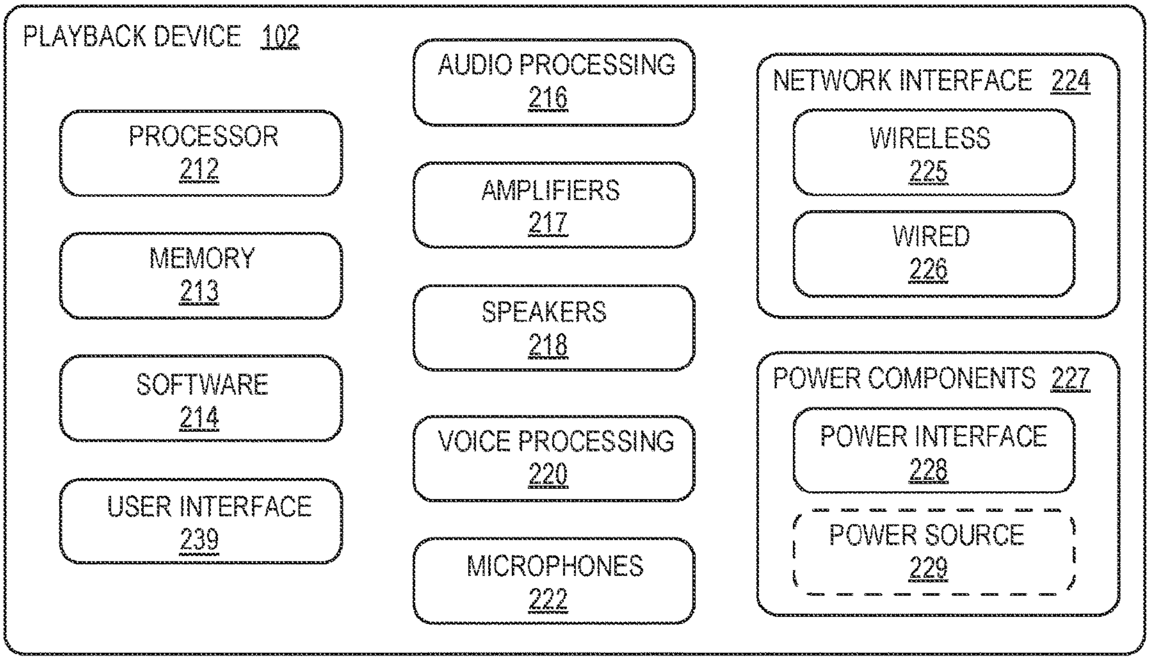
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain examples, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 239 that may facilitate user interactions independent of or in conjunction with user interactions facilitated by one or more of the controller devices 104. In various examples, the user interface 239 includes one or more physical buttons and/or supports graphical interfaces provided on touch sensitive screen(s) and/or surface(s), among other possibilities, for a user to directly provide input. The user interface 239 may further include one or more of lights (e.g., LEDs) and the speakers to provide visual and/or audio feedback to a user.

Figure 2B:
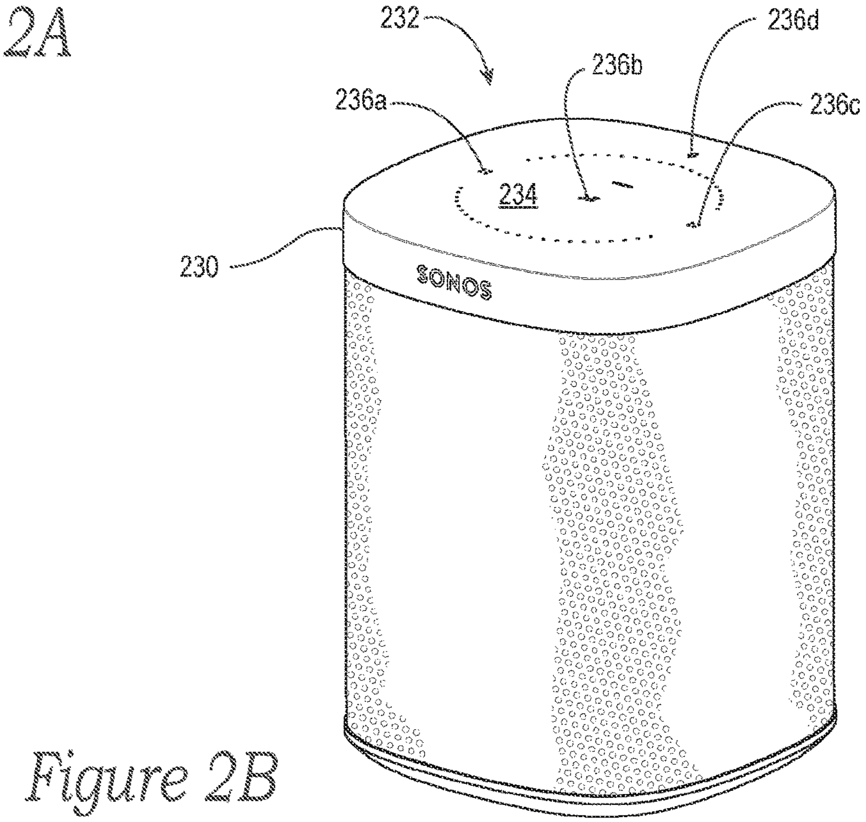
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
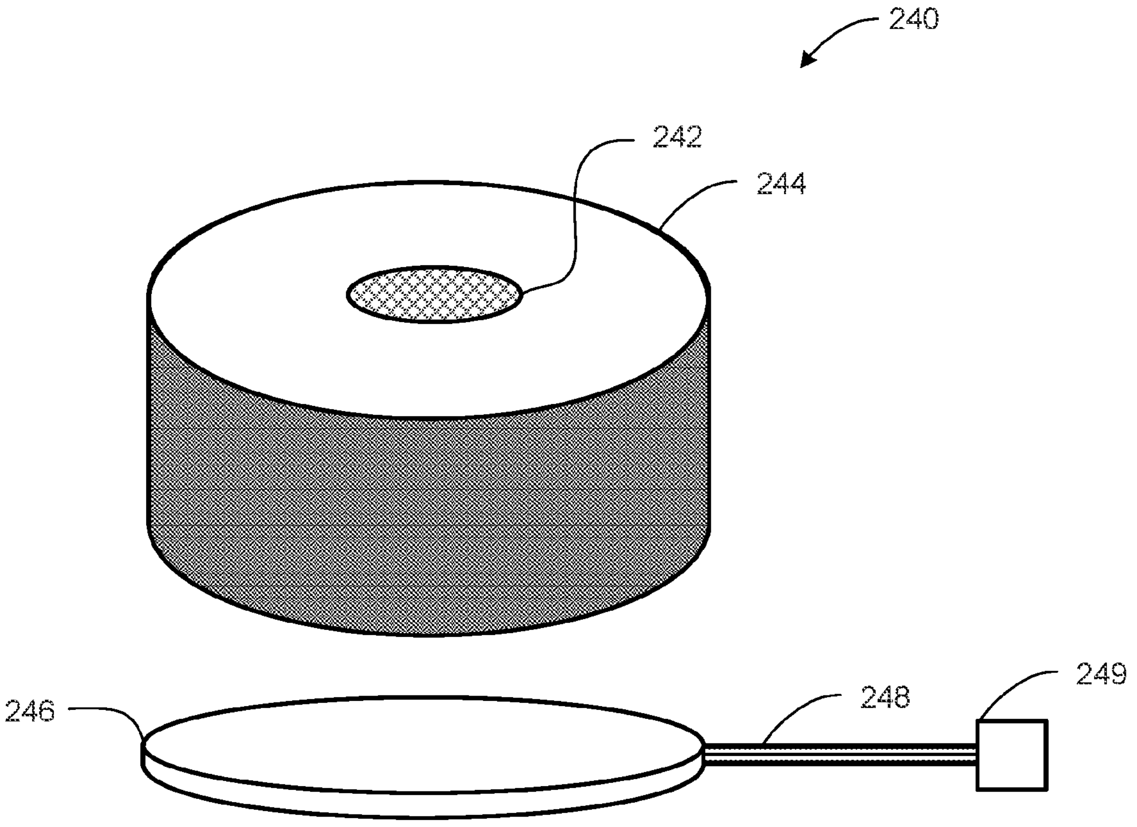
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example housing 240 for such a portable playback device. As shown, the housing 240 of the portable playback device includes a user interface in the form of a control area 242 at a top portion 244 of the housing 240. The control area 242 may include a capacitive touch sensor for controlling audio playback, volume level, and other functions. The housing 240 of the portable playback device may be configured to engage with a dock 246 that is connected to an external power source via cable 248 (e.g., a USB cable) coupled to a power adapter 249 (e.g., a power adapter that converts power from a wall outlet to a USB port). The dock 246 may be configured to provide power to the portable playback device to recharge an internal battery. In some embodiments, the dock 246 may comprise a set of one or more conductive contacts (not shown) positioned on the top of the docket 246 that engage with conductive contacts on the bottom of the housing 240 (not shown). In other embodiments, the dock 246 may provide power from the cable 248 to the portable playback device without the use of conductive contacts. For example, the dock 246 may wirelessly charge the portable playback device via one or more inductive coils (e.g., consistent with the QI wireless charging standard) integrated into each of the dock 246 and the portable playback device. Additionally, the dock 246 may comprise one or more mechanisms for communicating with the playback device using, for example, Near Field Communication (NFC) and/or BLUETOOTH communication.

By way of illustration, SONOS, Inc. presently offers (or has offered) for sale certain playback devices that may implement certain of the examples disclosed herein, including a "PLAY:1," "PLAY:3," "PLAY:5," "PLAYBAR," "MOVE," "ROAM," "CONNECT:AMP," "PLAYBASE," "BEAM," "ARC," "CONNECT," and "SUB." Any other past, present, and/or future playback devices may additionally or alternatively be used to implement the playback devices of example examples disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3A:
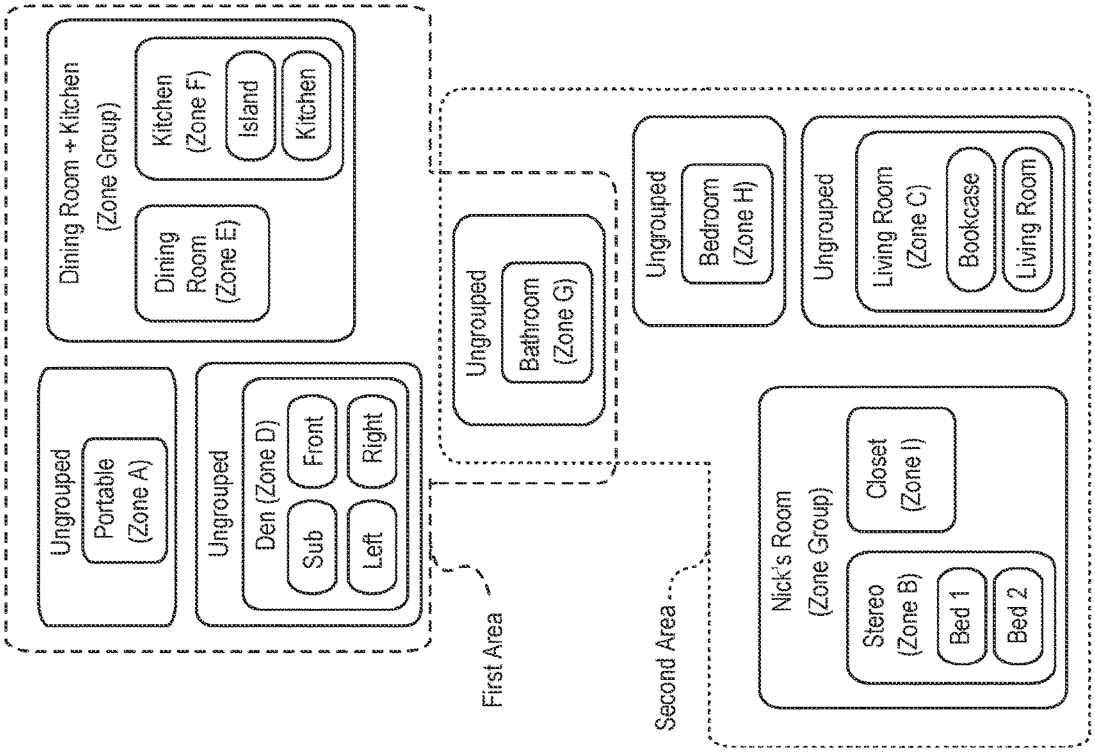
FIGS. 3A-3E are diagrams showing example playback device configurations in accordance with aspects of the disclosure.

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various examples, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some examples, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

Figure 3B:
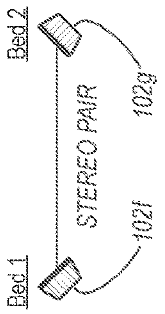

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Figure 3C:
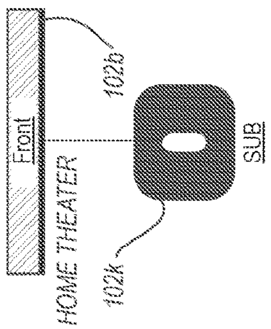
Figure 3D:
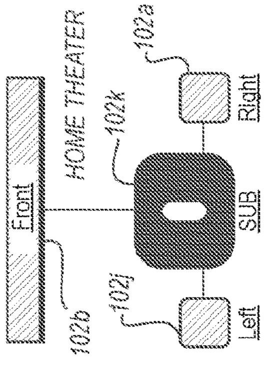

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

Figure 3E:
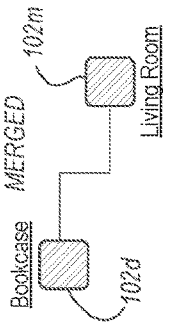

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one example, the playback devices 102*d* and 102*m* may playback audio in synchrony, during which each outputs the full range of audio content that each respective playback device 102*d* and 102*m* is capable of rendering.

In some examples, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some examples, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some examples, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some examples, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in Figure TA, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some examples, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In examples described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4A:
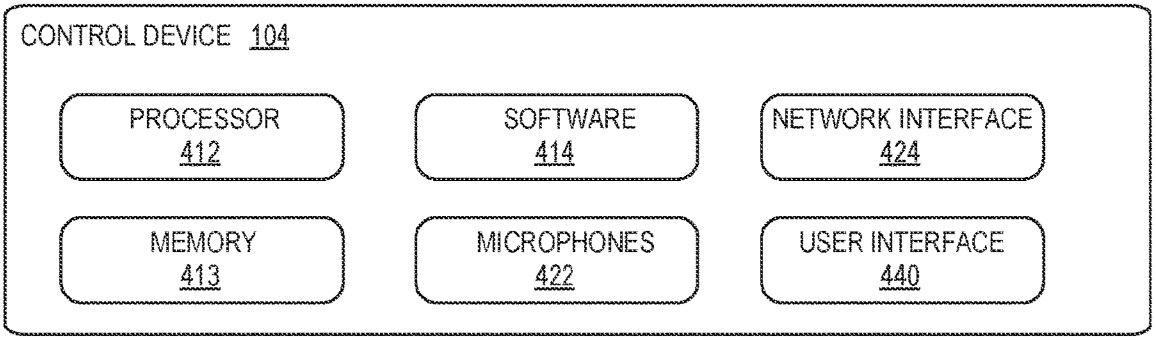
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 4B:
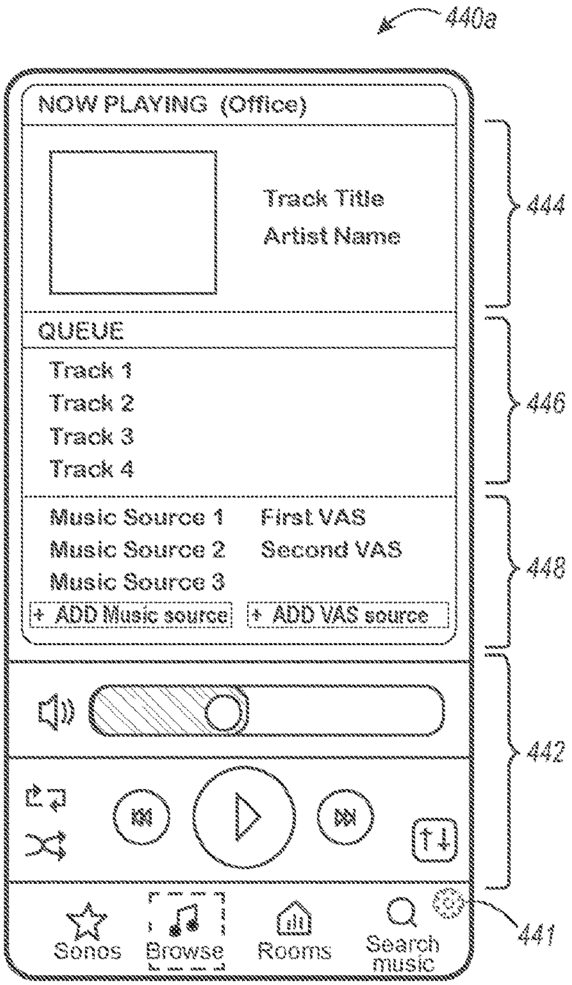
FIGS. 4B and 4C are controller interfaces in accordance with aspects of the disclosure.
Figure 4C:
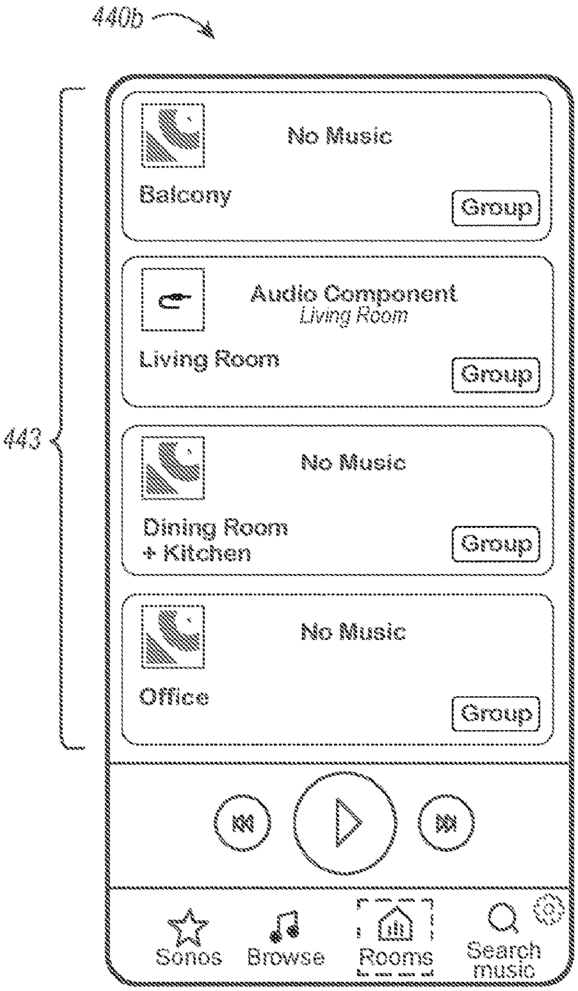

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some examples, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some examples, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative example, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some examples, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some examples, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some examples, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
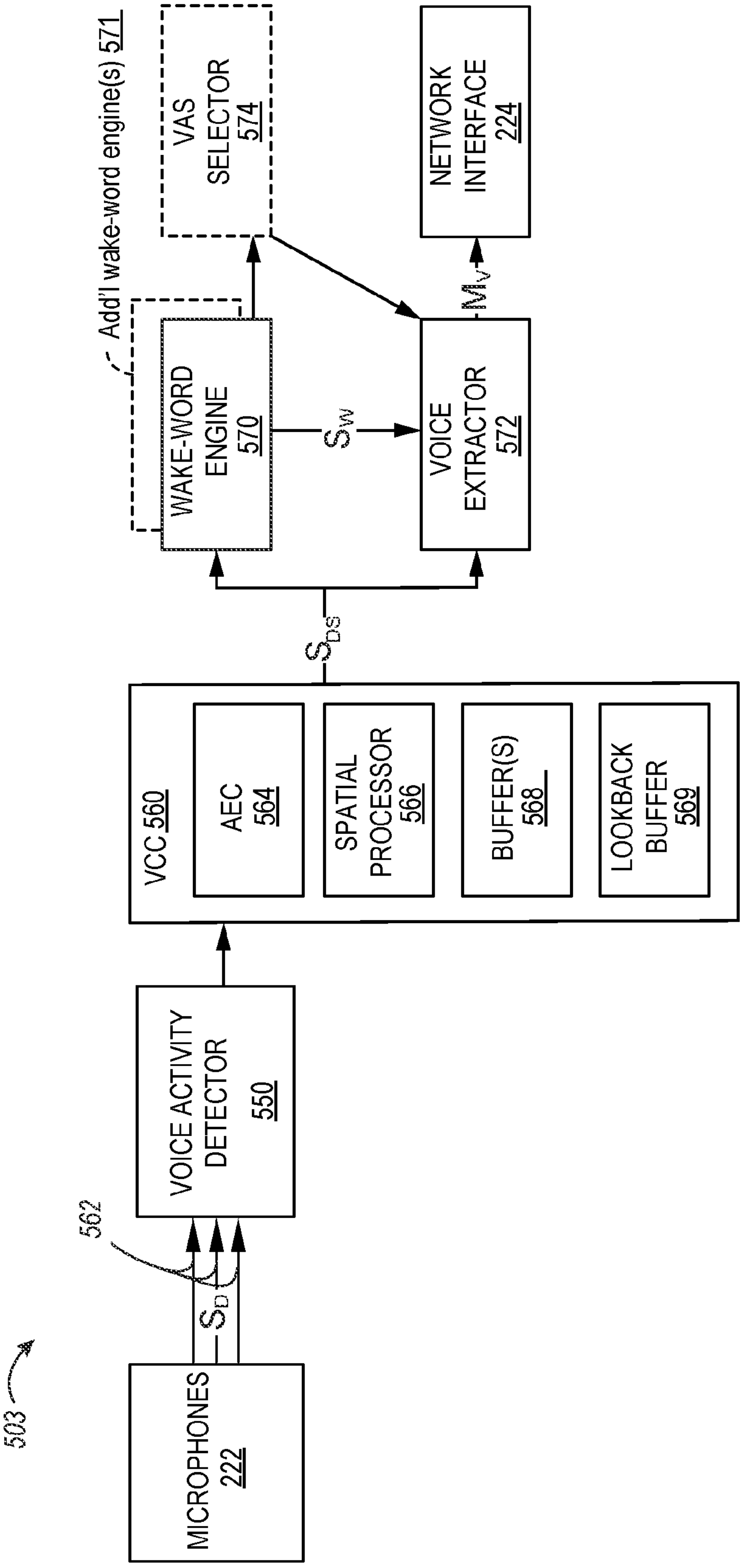
FIG. 5 is a functional block diagram of certain components of an example network microphone device in accordance with aspects of the disclosure.

FIG. 5 is a functional block diagram showing an NMD 503 configured in accordance with examples of the disclosure. The NMD 503 includes a voice activity detector 550, voice capture components ("VCC", or collectively "voice processor 560"), a wake-word engine 570, and at least one voice extractor 572, each of which is operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, $S_D$, from the environment of the NMD 503 to the voice activity detector 550. The detected sound $S_D$ may take the form of one or more analog or digital signals. In example implementations, the detected sound $S_D$ may be composed of a plurality signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

In operation, the voice activity detector 550 can process the detected sound $S_D$ to determine whether speech is present. If voice activity is detected, the detected sound $S_D$ can be passed to the VCC 560 for additional downstream processing. While in some examples the detected sound $S_D$ is passed to the VCC 560 without any processing via the voice activity detector 550, in various examples the voice activity detector 550 may perform certain processing functions such that the input to the voice activity detector 550 is not identical to the output $S_D$ provided to the VCC 560. For example, the voice activity detector 550 may buffer and/or time-delay the signal, may perform channel selection, or any other suitable pre-processing steps.

If, voice activity is not identified in the detected sound $S_D$ via the voice activity detector 550, then the further processing steps may be forgone. For example, the sound data may not be passed to the VCC 560 and downstream components. Additionally or alternatively, the downstream components can be configured to forgo processing the incoming sound data $S_D$, such as by the use of bypass tags or other techniques. In some examples, the downstream components (e.g., VCC 560, wake-word engine 570, voice extractor 572, network interface 224) can remain in a standby, disabled, or low-power state until voice activity is detected via the voice activity detector 550, at which point some or all of these downstream components can transition to a higher-power or fully operational state. When transitioning from the low-power, standby, or disabled stage to a fully operational stage, any number of components may be turned on, supplied power or additional power, taken out of standby or sleep stage, or otherwise activated in such a way that the enabled component(s) are allowed to draw more power than they could when disabled. With this arrangement, the NMD 503 can assume a relatively low-power stage while monitoring for speech activity via the voice activity detector 550. Unless and until the voice activity detector 550 identifies voice activity, the NMD 503 may remain in the low-power stage. In some examples, after transitioning to the higher-power or fully operational stage, the NMD 503 may revert to the low-power or standby stage once voice input is no longer detected via the voice activity detector 550, after a VAS interaction is determined to be concluded, and/or once a given period of time has elapsed.

In various examples, the voice activity detector 550 can perform a first algorithm for identifying speech in the sound data $S_D$ detected via the microphone(s) 222. The algorithm can include any suitable algorithm for discriminating between speech and non-speech sound data. In some examples, the algorithm can include extracting certain acoustic features from the sound data, such as energy-based features (e.g., signal-to-noise ratio), periodicity (e.g., speech signals tend to be more periodic than background noises), speech signal dynamics (e.g., analyzing the variance of power envelopes), or others. One or more such acoustic features can then be analyzed using statistical models or other discriminators to detect voice activity in the sound data. Example classifiers include Gaussian mixture models, Laplacian models, or other classifiers that discriminate between speech and non-speech sound data. Additional examples include using neural network-based approaches. As well as energy, other features including entropy, pitch, or zero-crossing rate can be used as input to the classifier. Many approaches can be implemented directly in the time-domain or alternatively in the frequency-domain by applying a filter bank to the microphone input signals. For example, a short-time Fourier transform (STFT) enables $S_D$ and the associated features to be efficiently split into multiple frequency bands each of which can be processed independently. In some examples, detecting speech in the sound data via the voice activity detector 550 consumes less power and/or computational resources (e.g., as measured by average CPU clock rate or millions of instructions per second (MIPS) values) than one or more of the downstream processes such as spatial processing, acoustic echo cancellation, wake-word detection, or any other downstream signal processing steps. For example, the amount of energy required to power a processing unit is directly related to the clock rate or MIPS, thus by reducing the average MIPS it is possible to also reduce average power consumption. In some examples, the VAD 550 process can run on a Digital Signal Processor (DSP) co-processing unit or Low Power Island (LPI), enabling the main CPU to sleep or transition to a low-power state at times when voice activity is not detected.

As further shown in FIG. 5, the voice processor 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 is configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake-word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some examples, the wake-word engine 570 runs multiple wake word detection algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection algorithm for each supported voice service in parallel. In such examples, the network microphone device 103 may include VAS selector components 574 configured to pass voice input to the appropriate voice assistant service. In other examples, the VAS selector components 574 may be omitted. In some examples, individual NMDs 103 of the MPS 100 may be configured to run different wake word detection algorithms associated with particular VASes. For example, the NMDs of playback devices 102*a* and 102*b* of the Living Room may be associated with AMAZON's ALEXA®, and be configured to run a corresponding wake word detection algorithm (e.g., configured to detect the wake word "Alexa" or other associated wake word), while the NMD of playback device 102*f* in the Kitchen may be associated with GOOGLE's Assistant, and be configured to run a corresponding wake word detection algorithm (e.g., configured to detect the wake word "OK, Google" or other associated wake word).

In some examples, a network microphone device may include speech processing components configured to further facilitate voice processing, such as by performing voice recognition trained to recognize a particular user or a particular set of users associated with a household. Voice recognition software may implement voice-processing algorithms that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream voice activity detector 550, AEC 564, and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some examples, a frame may include a portion of sound (e.g., one or more samples of a given sound specimen) and metadata regarding the portion of sound. In other examples, a frame may only include a portion of sound (e.g., one or more samples of a given sound specimen) or metadata regarding a portion of sound.

The voice processor 560 also includes at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 222 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some examples, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

Figure 6A:
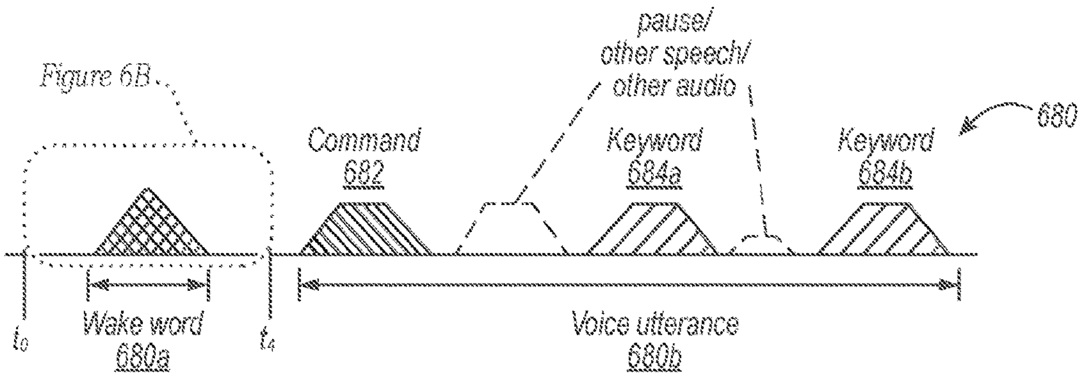
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680*a* and an utterance portion 680*b*. The wake-word portion 680*a* corresponds to detected sound that caused the wake-word event. For instance, the wake-word portion 680*a* corresponds to detected sound that caused the wake-word engine 570 to provide an indication of a wake-word event to the voice extractor 572. The utterance portion 680*b* corresponds to detected sound that potentially comprises a user request following the wake-word portion 680*a*.

Figure 6B:
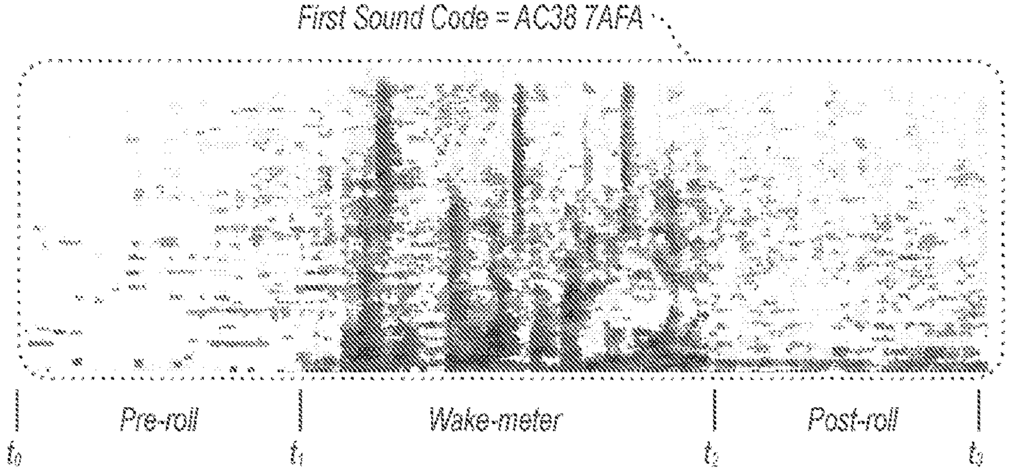
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680*a* of FIG. 6A. As illustrated, the example first sound specimen comprises sound detected in the playback device 102*i*'s environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680*a* within the sound-data stream $S_{DS}$ to verify the presence of the wake word. In some instances, the VAS may determine that the wake-word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680*a* but instead processes only the utterance portion 680*b*.

In any case, the VAS processes the utterance portion 680*b* to identify the presence of any words in the detected-sound data and to determine an underlying intent from these words. The words may correspond to a certain command and certain keywords 684 (identified individually in FIG. 6A as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680*b* may include additional information, such as detected pauses (e.g., periods of non-speech) between words spoken by a user, as shown in FIG. 6A. The pauses may demarcate the locations of separate commands, keywords, or other information spoke by the user within the utterance portion 680*b*.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570*a*, the second wake-word engine 570*b*, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570*a* may be configured to identify the wake word "Alexa" and cause the NMD 503 to invoke the AMAZON VAS when "Alexa" is spotted. As another example, the second wake-word engine 570*b* may be configured to identify the wake word "Ok, Google" and cause the NMD 503 to invoke the GOOGLE VAS when "Ok, Google" is spotted. In single-VAS implementations, the VAS selector 574 may be omitted.

In additional or alternative implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102*n*, either directly, or indirectly via one or more other devices of the MPS 100, which causes the office device 102*n* to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Acoustic Echo Cancellation and Convergence State Detection a. Dynamic Regularization

As shown in FIG. 5, the NMD 503 can include acoustic echo cancellation (AEC) components 564 upstream of the wake-word engine 570 and voice extractor 572. As noted previously, in operation, the sound data is passed from the microphones 222 to voice capture components (VCC) 560, which include the AEC 564. The AEC 564 receives the detected sound $S_D$ (and, as described in more detail below, also receives a reference signal) and filters or otherwise processes the sound to suppress echoes and/or to otherwise improve the quality of the detected sound $S_D$. That processed sound may then be passed to the spatial processor 566 and other downstream microphone input processing components.

Figure 7:
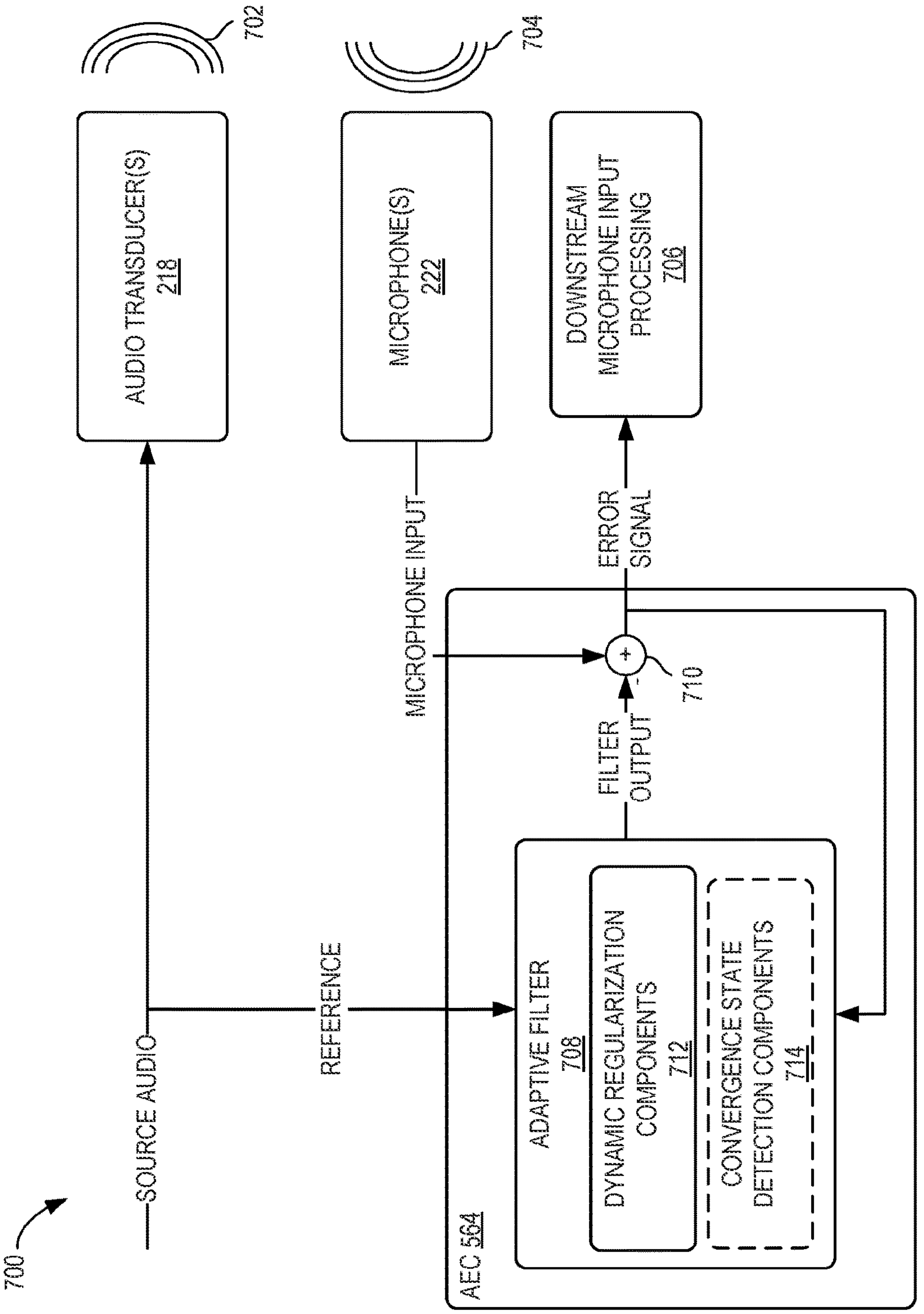
FIG. 7 is functional block diagram of certain components of an example network microphone device with acoustic echo cancellation in accordance with aspects of the disclosure.

FIG. 7 illustrates an example of certain components 700 of an NMD (e.g., NMD 503) associated with performing acoustic echo cancellation. As illustrated, source audio is provided as input to one or more audio transducers 218, which play back the audio as sound waves 702. In various examples, the audio transducers 218 can be integrated into the NMD, or the audio transducers can be discrete components that are powered by one or more audio drivers that receive the source audio and output signals that cause the audio transducers 218 to play back the audio.

One or more microphones 222 receive microphone input data via received sound waves 704. In operation, the sound waves 704 can include both (i) reflections of the sound waves 702 output via the transducer(s) 218 and (ii) audio originating from the environment, such as a user's voice as well as other environmental sounds (e.g., fan noise, traffic sounds, etc.). The microphone(s) 222 generate microphone input signals in response to the incoming sound waves 704.

The AEC 564 is configured to process the microphone input signals and reduce or eliminate any echoes therein (e.g., the portion of the microphone input signal corresponding to a reflection of the sound waves 702 emitted via the transducer(s) 218). By removing the "self-sound" from the microphone input, the downstream microphone input processing (e.g., wake word detection) can be improved.

The AEC 564 includes an adaptive filter 708 that receives a reference signal corresponding to the source audio input signal used to drive the audio transducer(s) 218. The adaptive filter 708 processes the reference signal and generates a filter output. Ideally, the filter output mirrors the portion of microphone input signals corresponding to the reflections of output sound waves 702 that reach the microphone(s) 222. As a result, when the filter output is subtracted (at block 710) from the microphone input signals, the resulting error signal ideally corresponds to the microphone input signals generated only from sounds originating in the environment (e.g., a user's voice input), and excludes the reflection of audio played back via the audio transducer(s) 218. This error signal is passed to the downstream microphone input processing components 706 for further processing (e.g., spatial processing, wake-word detection, voice extraction, etc.).

The adaptive filter 708 can include dynamic regularization components 712 and/or convergence state detection components 714. As described in more detail elsewhere herein, the dynamic regularization components 712 can control the rate of adaptation of the filter under various conditions. As also described in more detail elsewhere herein, the convergence state detection components 417 can determine a current convergence state of the adaptive filter and, in some instances, vary an adaptation parameter based on the determined convergence state.

The particular signal processing to be performed by the adaptive filter 708 depends on the surrounding environment. For example, the sound waves 702 output via the transducer(s) 218 may follow many acoustic paths before being detected via microphone(s) 222. Each path may have different physical length resulting in different time delays between the transducer(s) 218 and the microphone(s) 222. As the sound travels through the environment and bounces off surfaces, it may also be attenuated and/or absorbed. As such, the reflected sound that arrives at the microphone(s) 222 is the combination of these various delayed and attenuated copies of the original audio output 702.

To appropriately remove these reflected signals, the AEC 564 uses the adaptive filter 708 to apply an impulse response filter to the reference signal. The impulse response is a transfer function between the audio transducer(s) 218 and the microphone(s) 222 and is a function of the surrounding environment. Because both the output audio and the environment may change (e.g., more people may enter the room, the NMD may be moved, etc.), the impulse response filter is an adaptive filter that dynamically changes in response to detected changes in the audio transducer output and/or the microphone input signals. As illustrated in FIG. 7, the output error signal is provided back to the adaptive filter 708 in a feedback loop. As discussed in more detail below, this error signal is used in conjunction with other signals to dynamically and iteratively update the adaptive filter 708.

In the context of an NMD configured to process periodic voice inputs from a user, it is desirable to achieve a rapid convergence time. This may be particularly true as the first words of the user's voice input may be a wake word, which must be recognized by a wake word engine of the NMD to trigger appropriate downstream processing. As such, if the convergence time is too great (e.g., 1 second or more), the wake word may not be recognized in the user's voice input and the user will be required to repeat the wake word before issuing the desired commands. To avoid the frustration of the user in such cases, the acoustic echo cancellation process can be configured to achieve a rapid convergence time.

Slow convergence may be particularly problematic in the case of portable NMDs. Because the performance of the adaptive filter 708 depends on the room environment, changing the location or orientation of the NMD can significantly reduce the performance of the adaptive filter 708, leading to poor echo cancellation and attendant reduction in the accuracy of keyword spotting or other downstream processing of the user's voice input. As one example, if a user moves a portable NMD from an open counter to the middle of a bookshelf, the room impulse response will be markedly different. In particular, there will be far larger echoes detected via the microphone(s) 222 due to the nearby reflective surfaces of the bookshelf. In such cases, the prior configuration of the adaptive filter 708 may be wholly unsuited to the new position, and as such the performance of the AEC 564 may suffer until sufficient time has passed for the adaptive filter 708 to reach convergence in the new location. In some cases, this convergence may take on the order of several seconds or even minutes, which leads to poor user experience as the NMD fails to appropriately detect and process the first few seconds of the user's voice input. In some cases, this initial input may include some or all of the wake word, and as such failure to process this initial input may lead to a failure to detect the wake word and to trigger appropriate downstream processes.

As shown in FIG. 7, the adaptive filter 708 includes dynamic regularization components 712. These components can be configured to apply a variable adaptation parameter that determines, at least in part, a magnitude of change in the adaptive filter from one iteration to the next. For example, the adaptive filter can iterate with each subsequent frame of input data, and the adaptation parameter can limit a magnitude of change the adaptive filter output from one iteration to the next. By utilizing a larger adaptation parameter, the adaptive filter can update more quickly. However, a smaller adaptation parameter can allow for more fine-tuned adjustments that lead to better performance of the adaptive filter (e.g., less correlation between the reference signal and the filter output, and/or lower error signal). To address this trade-off between convergence speed and performance, dynamic regularization components 712 are configured to vary the adaptation parameter over time. For example, at an initial state, the adaptation parameter can have an initial or default value, and this value can decrease over time in a manner that allows for initially large changes in the adaptive filter 708 to achieve convergence or near-convergence in a short period of time, with the magnitude of changes decreasing over time to allow for more fine-tuned adjustments.

With reference to the configuration shown in FIG. 7, the error signal E for a given frame m is given by the following equation:

$$E(m) = Y(m) - \sum H(m-1)X(m) \qquad \text{(Equation 1)}$$

Where Y(m) is the microphone input signal and X(m) is the reference signal for a given frame m. The adaptive filter H for a given frame m is provided by the following equation:

$$H(m) = H(m-1) + \mu(1-\beta)S^{-1}(m)X^H(m)E(m) \qquad \text{(Equation 2)}$$

where $\beta$ is an is an infinite impulse response (IIR) filter coefficient for power spectrum smoothing and $\mu$ is an adaptation parameter that determines, at least in part, the rate of adaptation of the adapter filter H from one frame to the next.

The adaptation parameter $\mu$ can itself vary over time according to the function:

$$\mu = \mu_0 \frac{R_{XX}}{R_{XX}^2 + \gamma R_{EE}^2} \qquad \text{(Equation 3)}$$

where $\mu_0$ is a constant step size factor, $R_{XX}$ is a function of the reference signal energy (e.g., an autocorrelation of the reference signal), $R_{EE}$ is a function of the filter output energy (e.g., an autocorrelation of the filter output), and $\gamma$ is a regularization parameter. In some embodiments, $R_{XX}$ can be an instantaneous reference energy, an average reference energy, or other suitable functions of the reference signal. In various examples, $R_{EE}$ can be an instantaneous output energy, an average output energy, or other suitable functions of the error signal. Similar approaches using expressions other than squared may also be used. In at least some embodiments, the equations utilized can include a divide-by-zero control, such as a non-zero constant included in the denominator. For example, additional approaches for updating the adaptation parameter can take the form of either of the following equations:

$$\mu = \mu_0 \frac{R_{XX}}{R_{XX}^2 + \gamma R_{EE}} \quad \text{(Equation 4)}$$

$$\mu = \frac{\mu_0}{R_{XX} + \gamma R_{EE}} \quad \text{(Equation 5)}$$

In some examples, the dynamic adjustment of the adaptation parameter can be achieved by directly modifying the value of regularization parameter γ. Decreasing the value of the regularization parameter γ directly increases the value of the adaptation parameter μ, and therefore increases the step-size of the filter output from one frame to the next. Conversely, increasing the value of the regularization parameter γ directly decreases the value of the adaptation parameter μ, and therefore reduces the step-size of the filter output from one frame to the next. In various examples, different methods can be used to update the regularization parameter γ and or the adaptation parameter μ, for example utilizing the reference input, microphone input, filter output, and/or external controls such as double-talk detection, speech presence probability, accelerometer readings, or any other such external or internal inputs.

A larger adaptation parameter μ can be useful for more rapid convergence, but to achieve more fine-tuned performance of the filter, the adaptation parameter μ can be incrementally reduced over time. Problems may arise, however, when the adaptation parameter μ has a relatively low value, and changes in the environment result in a lack of convergence. Because the adaptation parameter μ has a low value, the relatively small step-size in filter output from one frame to the next result in a longer time required to re-converge following the changed conditions. As noted previously, slow convergence can be particularly problematic when capturing and processing voice input from a user.

Accordingly, in various examples the adaptation parameter μ can be "reset" to a greater default value, e.g., in response to detection of a reset event. For example, the dynamic regularization components 712 can be configured to determine or receive an indication of a reset event. And in response to such a reset event, the dynamic regularization components 712 can reset the adaptation parameter to a default value (e.g., a relatively large value allowing for rapid convergence). For example, in the case of a portable NMD, a determination that the device has been moved may be a reset event. Movement can be determined using accelerometer data, a loss of connection to a charging station, a re-connection to a previously disconnected charging station, or any other suitable technique for detecting movement of the device. Because movement of the device will affect the room impulse response and therefore the adaptive filter performance, it can be beneficial to reset the adaptation parameter to a larger or initial value following this detection of movement. Other examples of reset events include detecting the presence of one or more users in the environment (e.g., using microphone input data, received signal strength indicator (RSSI) information, or other such user localization techniques), an initial power-up event, or a user-provided input (e.g., a user can indicate via a control device such as a smartphone that microphone performance is poor, in which case the adaptation parameter can be reset).

Figure 8:
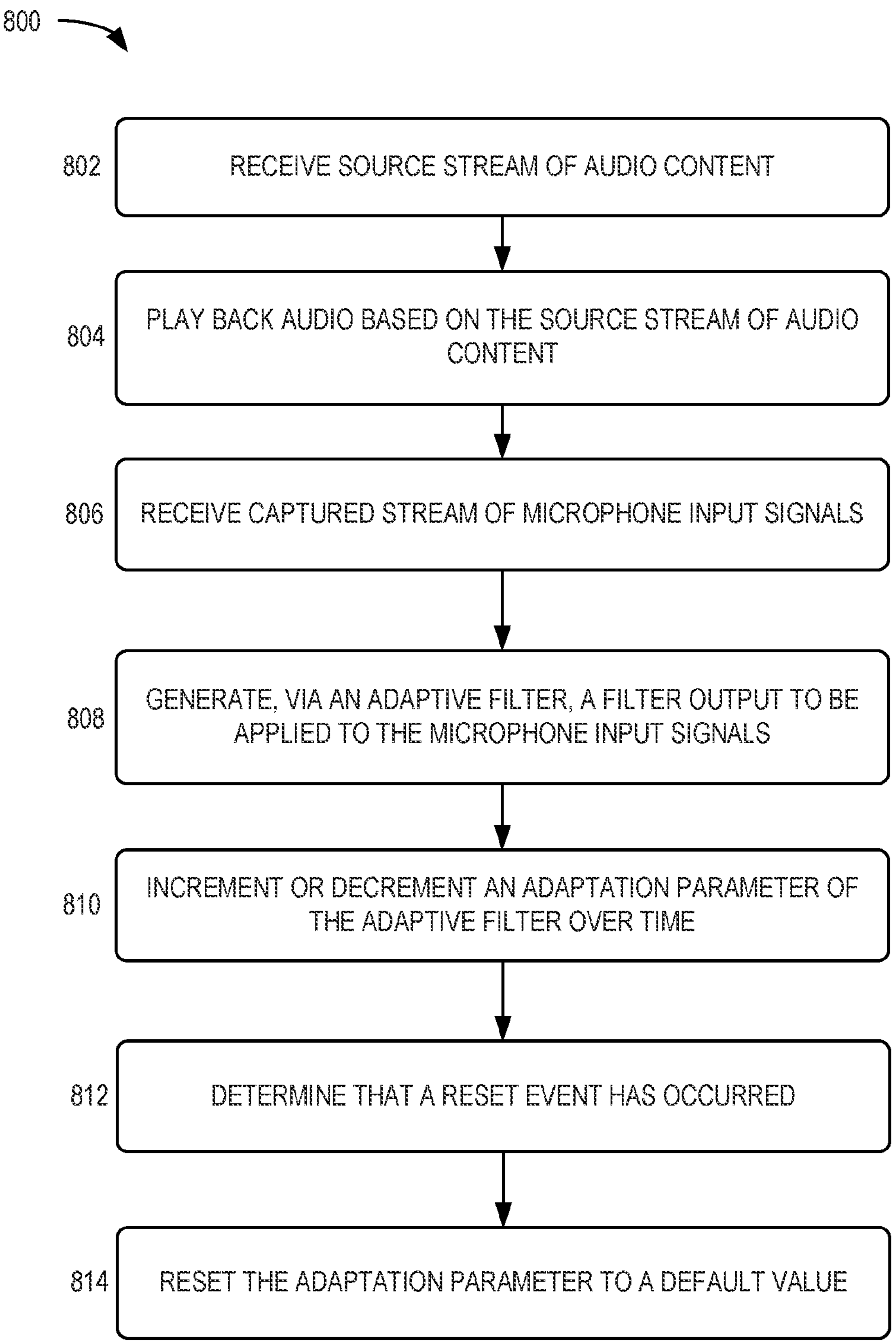
FIG. 8 is a flow chart of an example method for acoustic echo cancellation in accordance with aspects of the disclosure.

As discussed above, in some examples, an NMD is configured to dynamically modify an adaptive filter for acoustic echo cancellation. FIG. 8 shows an example of a method 800 for dynamically modifying performance of an adaptive filter. The method 800 can be implemented by any of the NMDs disclosed and/or described herein, or any other NMD now known or later developed.

Various examples of method 800 include one or more operations, functions, and actions illustrated by blocks 802 through 814 Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

The method 800 begins at block 802, which involves receiving a source stream of audio content. The source stream of audio content can be received over a network interface (e.g., streaming audio from a media content provider) or audio content received over a physical line-in connection. At block 804, the NMD plays back audio based on the source stream of audio content.

The method 800 continues in block 806 with receiving a captured stream of microphone input signals. As discussed previously, the microphone input signals may include a combination of reflections of the audio played back via the NMD in block 804, as well as audio from other sources in the environment (e.g., user voice input, background noise, etc.). To process user voice input more effectively and/or to detect other sounds in the environment, it is beneficial to remove as much of the reflected audio signals as possible before performing further downstream processing on the microphone input signals.

In block 808, the method 800 involves generating, via an adaptive filter of the NMD, a filter output to be applied to the microphone input signals. As discussed previously with respect to FIG. 7, the adaptive filter can be configured to remove (or at least reduce) the reflected audio output received at the microphones, such that the output of the adaptive filter corresponds more closely to the sounds originating from the environment. The adaptive filter can include an adaptation parameter that determines, at least in part, the rate at which the filter is updated or dynamically adjusted to compensate for changes in the microphone input signals and/or reference signals. At block 810, the adaptation parameter can be incremented or decremented over time.

The method 800 continues in block 812 with determining that a reset event has occurred and, in block 814, resetting the adaptation parameter to a default value after determining that the reset event has occurred. For example, the adaptation parameter can be reset to a default value (which may be greater than the pre-existing value) in response to detection of a reset event. The reset event can take a number of different forms. In some instances, such as in the case of a portable NMD, a determination that the device has been moved or disconnected from its charging base may be a reset event. Because movement of the device will affect the room impulse response and therefore the adaptive filter performance, it can be beneficial to reset the adaptation parameter to a larger or initial value following this detection of movement. Other examples of reset events include detecting the presence of one or more users in the environment, an initial power-up event, or a user-provided input.

Figure 9:
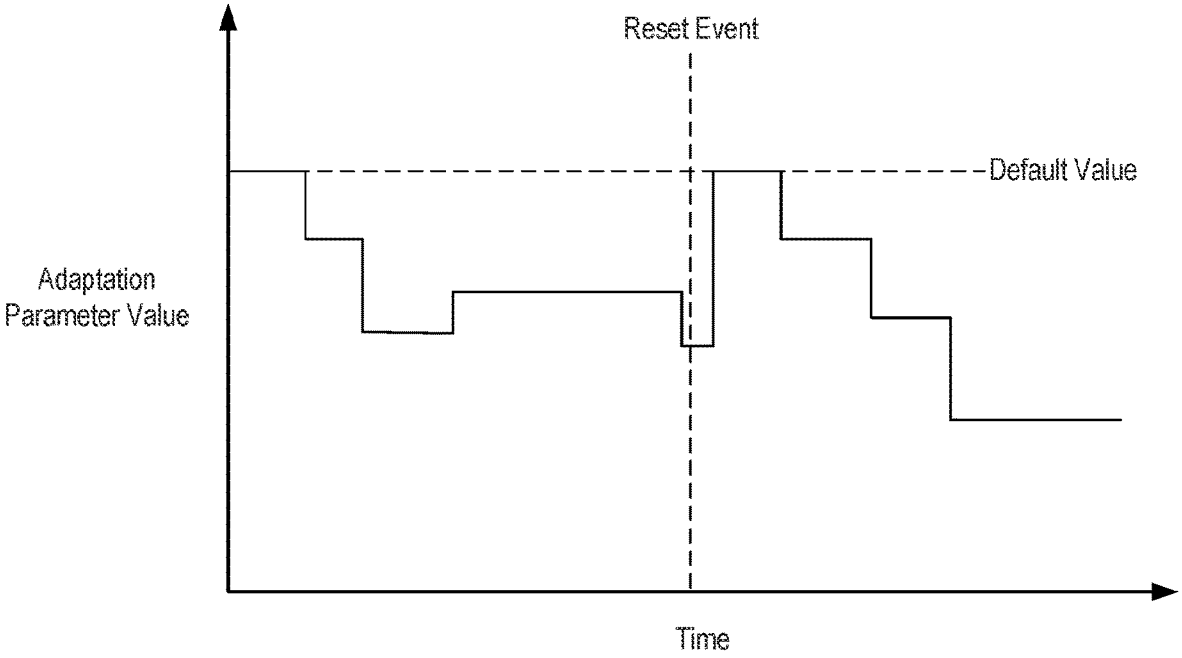
FIG. 9 is a chart of adaptation parameter values over time during acoustic echo cancellation using dynamic regularization in accordance with aspects of the disclosure.

FIG. 9 is a chart illustrating an example of variations in the adaptation parameter value over time. As shown, the adaptation parameter value begins at a default value or initial state, which may correspond to relatively large step-sizes in the filter outputs from one frame to the next. The adaptation parameter may vary over time, e.g., being decremented or incremented based on the error signal feedback to the adaptive filter. As illustrated in FIG. 9, following a reset event, the adaptation parameter value can be reset to the default value (or other appropriate value that results in a relatively larger step-size increase.

b. Convergence State Detection

Errors in adaptive filter convergence may occur, for example when the environment is abruptly changed (e.g., device is moved, one or more people enter the room, etc.). In such states, it may be useful to "reset" the gamma value to increase the step size of the adaptive filter. As noted above, in some examples certain reset events may be detected that prompt the adaptation parameter to be reset. Additionally or alternatively, a convergence state detection process can be used to evaluate current performance of the adaptive filter. In particular, such a detection process can determine whether the adaptive filter has achieved convergence or is in an error state. If a convergence error is detected, the adaptation parameter can be reset to a default value (or other larger value that results in faster convergence times).

As shown in FIG. 7, the adaptive filter 708 also includes convergence state detection components 714. These components can be configured to detect a current, instantaneous convergence state of the adaptive filter 708. As described in more detail below, a convergence state of the adaptive filter can be determined by monitoring the reference signal, error signal, and/or the microphone input signals to determine whether the adaptive filter has achieved convergence. If the convergence state detection components 714 determine that the adaptive filter is not converged, then the adaptation parameter can be increased or at least limited from further decreases. If, in contrast, the convergence state detection components 714 determine that the adaptive filter 708 has reached convergence, then the adaptation parameter can be reduced or at least not prohibited from further decreases.

In various examples, the convergence state detection process can include calculating various correlations: an autocorrelation of the frequency-domain reference signal, an autocorrelation of the frequency-domain filter output, and a cross-correlation of the reference signal and the filter output. These three correlations can then be combined to output a single convergence state value (e.g., a correlation coefficient having a normalized value between 0 and 1, with values nearer to 0 indicating convergence and values closer to 1 indicating residual echo and lack of convergence). A threshold can be applied (e.g., values below 0.4 indicating convergence), and a counter can be used to determine if a convergence state has been achieved (e.g., threshold must be exceeded for a predetermined time period or number of frames). By using such correlations to evaluate an acoustic echo cancellation convergence state, the adaptive filter 708 can be modified in real-time using a variable adaptation parameter that responds dynamically to the real-time performance of the adaptive filter. This can achieve both rapid initial convergence of the adaptive filter 708 as well as allowing for more fine-tuned adjustments to the adaptive filter to improve overall performance.

In some examples, the convergence state can be determined by using a correlation coefficient ρ for frequency bin k, frame i, defined by the following equation:

$$\rho_{EX}[k, i] = \frac{|R_{EX}[k, i]|}{\sqrt{R_{EE}[k, i] \cdot R_{XX}[k, i] + \varepsilon}} \quad \text{(Equation 6)}$$

where $R_{XX}$ a frequency-domain autocorrelation of the reference signal, $R_{EE}$ is a frequency-domain autocorrelation of the filter output, $R_{EX}$ is a frequency-domain cross-correlation of the reference signal and the filter output, and ε is a non-zero constant for divide-by-zero control. In various examples, the correlation coefficient can be normalized to provide a value between 0 and 1, with values nearer to 0 indicating successful convergence and values nearer to 1 indicating convergence errors. By monitoring the value of the correlation coefficient ρ over time, the adaptive filter can be modified (e.g., the rate of adaptation can be increased as appropriate or reset to a default value) when the correlation coefficient value indicates a convergence error.

In some examples, the correlation coefficient value may indicate an error state by comparison to a threshold value. If the correlation coefficient exceeds the threshold, it indicates slow convergence, and an error state can be flagged. To reduce false-positives and to allow time for convergence, a frame counter function can be used, for example requiring a certain number of consecutive frames that indicate supra-threshold correlation coefficient values before a convergence error is indicated.

Figure 10:
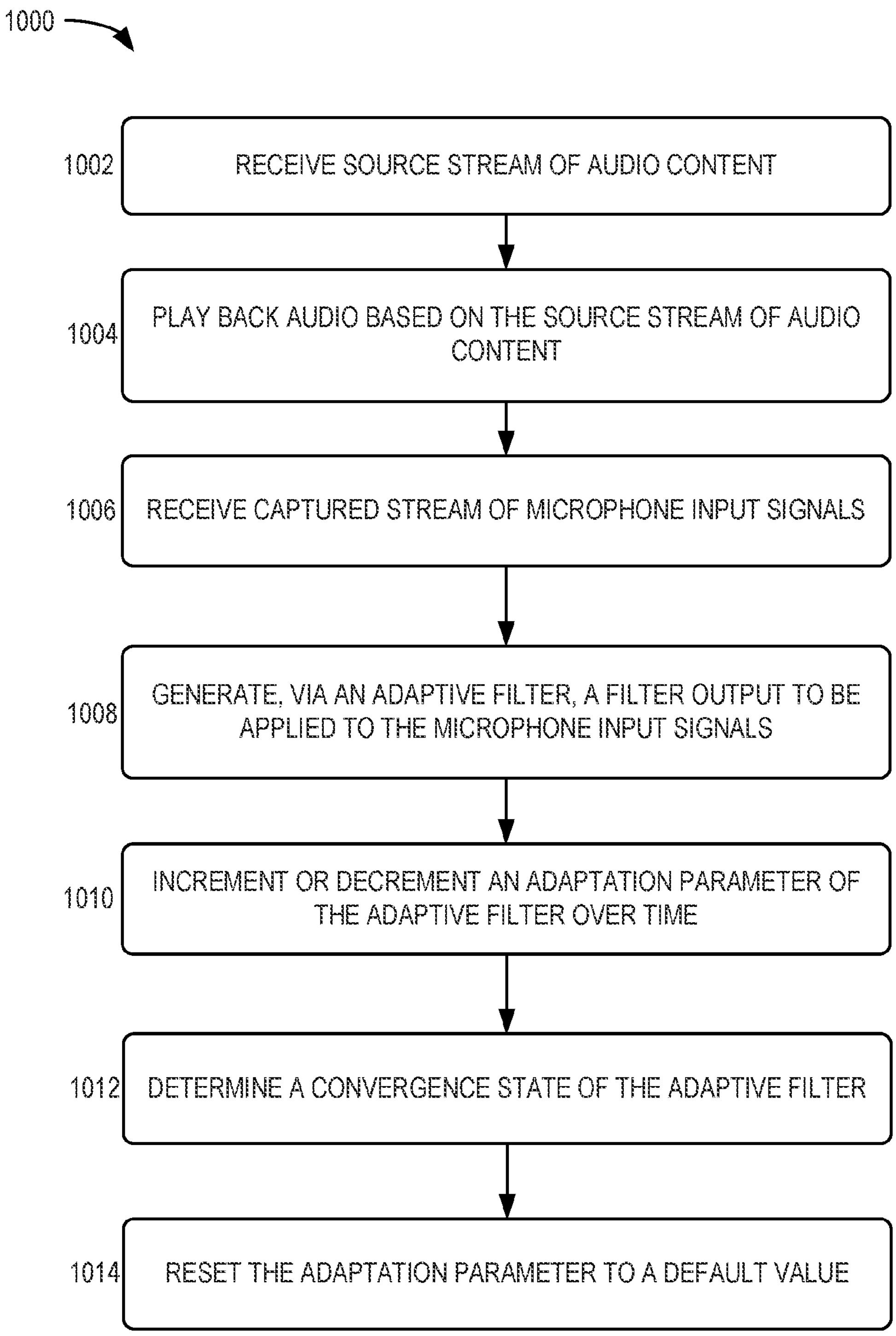
FIG. 10 is a flow chart of another example method for acoustic echo cancellation in accordance with aspects of the disclosure.

As discussed above, in some examples, an NMD can be configured to monitor a convergence state of an adaptive filter for acoustic echo cancellation. In response to detecting a convergence state error, the adaptive filter can be adjusted (e.g., to increase an adaptation parameter). FIG. 10 shows an example of a method 1000 for detecting a convergence state of an adaptive filter. The method 1000 can be implemented by any of the NMDs disclosed and/or described herein, or any other NMD now known or later developed.

Various examples of method 1000 include one or more operations, functions, and actions illustrated by blocks 1002 through 1014. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In some examples, blocks 1002 to 1010 can be performed substantially as described above with respect to blocks 802 to 810 of FIG. 8. The method 1000 begins at block 1002, which involves receiving a source stream of audio content. The source stream of audio content can be received over a network interface (e.g., streaming audio from a media content provider) or audio content received over a physical line-in connection. At block 1004, the NMD plays back audio based on the source stream of audio content.

The method 1000 continues in block 1006 with receiving a captured stream of microphone input signals. As discussed previously, the microphone input signals may include a combination of reflections of the audio played back via the NMD in block 1004, as well as audio from other sources in the environment (e.g., user voice input, background noise, etc.). In block 1008, the method 1000 involves generating, via an adaptive filter of the NMD, a filter output to be applied to the microphone input signals. At block 1010, the adaptation parameter can be incremented or decremented over time.

The method 1000 continues in block 1012 with determining a convergence state of the adaptive filter and, in block 1014, resetting the adaptation parameter to a default value after determining that the reset event has occurred. For example, the adaptation parameter can be reset to a default value (which may be greater than the pre-existing value) in response to detection of a convergence error state (e.g., slow convergence of the adaptive filter resulting in high levels of reflected audio remaining in the signal output from the adaptive filter).

As described previously, the convergence state detection process can include calculating various correlations such as an autocorrelation of the frequency-domain reference signal, an autocorrelation of the frequency-domain filter output, and a cross-correlation of the reference signal and the filter output. These correlations may then be combined to output a single convergence state value, and a threshold can be applied (e.g., values below or above a threshold indicating a convergence error). In some examples, a counter can be used to determine if a convergence state has been achieved (e.g., threshold must be exceeded for a predetermined time period or number of frames). By using such correlations to evaluate an acoustic echo cancellation convergence state, the adaptive filter can be modified in real-time using a variable adaptation parameter that responds dynamically to the real-time performance of the adaptive filter. This can achieve both rapid initial convergence of the adaptive filter as well as allowing for more fine-tuned adjustments to the adaptive filter to improve overall performance.

Figure 11A:
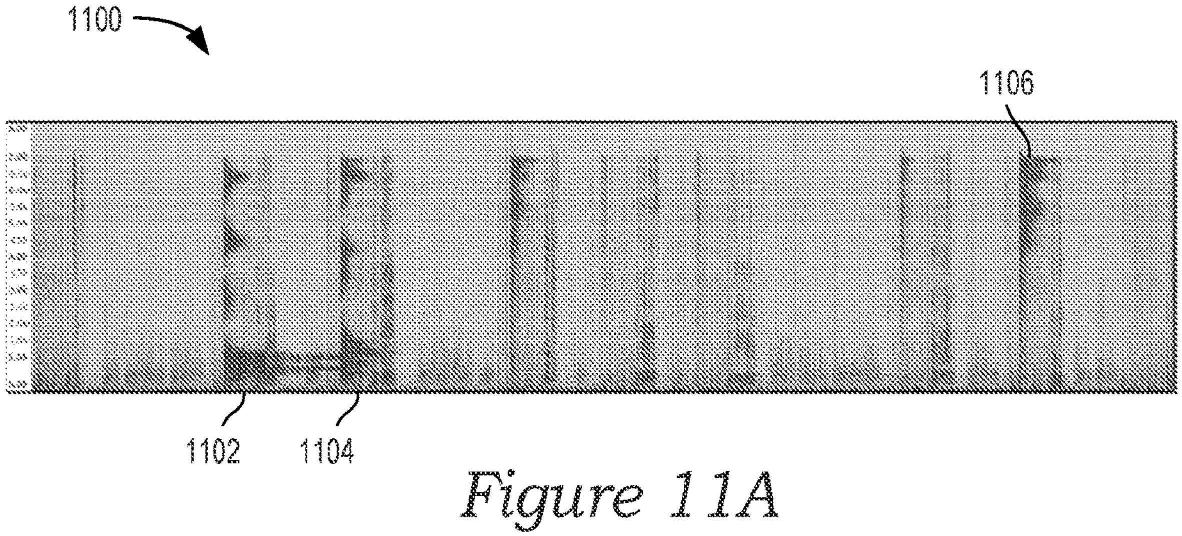
FIGS. 11A and 11B illustrate example spectra of microphone data both without and with convergence state detection applied in accordance with aspects of the disclosure.
Figure 11B:
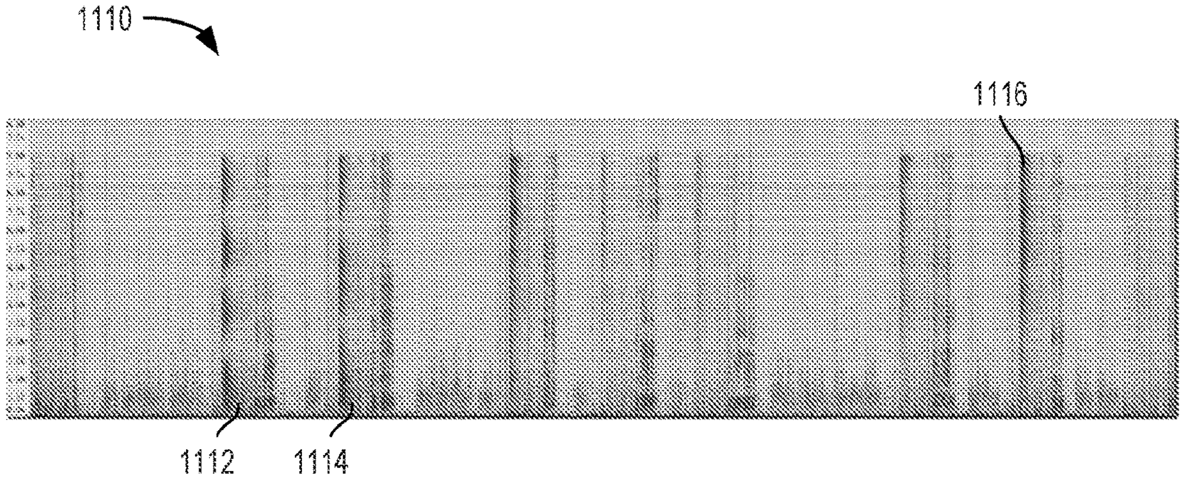

FIGS. 11A and 11B illustrate example spectra of microphone output signals. In FIG. 11A, no convergence state detection is applied, and as a result, in the spectrum 1100 there are various instances 1102, 1104, and 1106 of convergence errors (e.g., slow convergence times resulting in higher noise values at the indicated instances). FIG. 11B illustrates a spectrum 1110 in which acoustic echo cancellation using convergence state detection has been applied. As a result, when the convergence errors were identified, the adaptation parameter was reset to allow faster convergence, and accordingly the convergence errors were reduced or eliminated at instances 1112, 1114, and 1116. As a result, the adaptive filter was able to re-converge following detection of a convergence error in about 0.5 seconds of residual echo.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring aspects of the examples. Accordingly, the scope of the present disclosure is defined by the appended claims rather than the forgoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A network microphone device (NMD) comprising: one or more microphones; one or more audio drivers; one or more processors; and data storage having instructions therein that, when executed by the one or more processors, cause the NMD to perform operations comprising: receiving a source stream of audio comprising source audio content to be played back via the one or more audio drivers; playing back, via the one or more audio drivers, the source audio content; receiving, via the one or more microphones, a captured stream of microphone input signals; generating, via an adaptive filter, a filter output to be applied to the microphone input signals, the filter output generated using a reference signal corresponding to the source audio content and the microphone input signals, wherein the adaptive filter H for a given frame m is dynamically updated according to the equation: H(m)=H(m−1)+U(m), where U(m) is an update function having a variable adaptation parameter; incrementing or decrementing the adaptation parameter over time based at least in part on the filter output; determining that a reset event has occurred; and after determining that the reset event has occurred, resetting the adaptation parameter to a default value.

Example 2. The NMD of any one of the preceding Examples, wherein resetting the adaptation parameter to a default value increases an adaptation rate of the adaptive filter.

Example 3. The NMD of any one of the preceding Examples, wherein the adaptation parameter μ varies over time according to the function:

$$\mu = \mu_0 \frac{R_{XX}}{R_{XX}^2 + \gamma R_{EE}^2 + \varepsilon}$$

where μ0 is a constant step size factor; where RXX is a function of the reference signal energy; where REE is a function of the filter output energy; where γ is a regularization parameter; and where ε is a divide-by-zero control.

Example 4. The NMD of any one of the preceding Examples, the operations further comprising decreasing a value of the regularization parameter γ to increase the adaptation parameter μ.

Example 5. The NMD of any one of the preceding Examples, wherein resetting the adaptation parameter μ to an initial value comprises resetting the regularization parameter γ to a default value.

Example 6. The NMD of any one of the preceding Examples, wherein the operations further comprise: applying the filter output to the microphone input signals to generate filtered microphone signals; and using the filtered microphone signals to detect a voice input.

Example 7. The NMD of any one of the preceding Examples, wherein the reset event comprises one or more of: an indication that the NMD has moved; an indication that the NMD has been disconnected from its charging station; an indication that the NMD has been re-connected to its charging station; an initial power-up event; an indication of user presence in the environment; or an indication of motion detected in the environment.

Example 8. A method comprising: receiving, at a network microphone device (NMD), a source stream of audio comprising source audio content to be played back via the one or more audio drivers; playing back, via the NMD, the source audio content; receiving, via one or more microphones of the NMD, a captured stream of microphone input signals; generating, via an adaptive filter of the NMD, a filter output to be applied to the microphone input signals, the filter output generated using a reference signal corresponding to the source audio content and the microphone input signals, wherein the adaptive filter H for a given frame m is dynamically updated according to the equation: H(m)=H(m−1)+U(m), where U(m) is an update function having a variable adaptation parameter; incrementing or decrementing the adaptation parameter over time based at least in part on the filter output; determining that a reset event has occurred; and after determining that the reset event has occurred, resetting the adaptation parameter to a default value.

Example 9. The method of any one of the preceding Examples, wherein resetting the adaptation parameter to a default value increases an adaptation rate of the adaptive filter.

Example 10. The method of any one of the preceding Examples, wherein the adaptation parameter μ varies over time according to the function:

$$\mu = \mu_0 \frac{R_{XX}}{R_{XX}^2 + \gamma R_{EE}^2 + \varepsilon}$$

where μ0 is a constant step-size factor; where RXX is a function of the reference signal energy; where REE is a function of the filter output energy; where γ is a regularization parameter; and where ε is a divide-by-zero control.

Example 11. The method of any one of the preceding Examples, the operations further comprising decreasing a value of the regularization parameter γ to increase the adaptation parameter μ.

Example 12. The method of any one of the preceding Examples, wherein resetting the adaptation parameter μ to an initial value comprises resetting the regularization parameter γ to a default value.

Example 13. The method of any one of the preceding Examples, further comprising: applying the filter output to the microphone input signals to generate filtered microphone signals; and using the filtered microphone signals to detect a voice input.

Example 14. The method of claim 8, wherein the reset event comprises one or more of: an indication that the NMD has moved; an indication that the NMD has been disconnected from its charging station; an indication that the NMD has been re-connected to its charging station; an initial power-up event; an indication of user presence in the environment; or an indication of motion detected in the environment.

Example 15. A tangible, non-transitory, computer-readable medium storing instructions that, when executed by one or more processors of a network microphone device (NMD), cause the NMD to perform operations comprising: receiving, at the NMD, a source stream of audio comprising source audio content to be played back via the one or more audio drivers; playing back, via the NMD, the source audio content; receiving, via one or more microphones of the NMD, a captured stream of microphone input signals; generating, via an adaptive filter of the NMD, a filter output to be applied to the microphone input signals, the filter output generated using a reference signal corresponding to the source audio content and the microphone input signals, wherein the adaptive filter H for a given frame m is dynamically updated according to the equation: H(m)=H(m−1)+U(m), where U(m) is an update function having a variable adaptation parameter; incrementing or decrementing the adaptation parameter over time based at least in part on the filter output; determining that a reset event has occurred; and after determining that the reset event has occurred, resetting the adaptation parameter to a default value.

Example 16. The computer-readable medium of any one of the preceding Examples, wherein resetting the adaptation parameter to a default value increases an adaptation rate of the adaptive filter.

Example 17. The computer-readable medium of any one of the preceding Examples, wherein the adaptation parameter μ varies over time according to the function: μ=

$$\mu_0 \frac{R_{XX}}{R_{XX}^2 + \gamma R_{EE}^2 + \varepsilon}$$

where μ0 is a constant step-size factor; where RXX is a function of the reference signal energy; where REE is a function of the filter output energy; where γ is a regularization parameter; and where ε is a divide-by-zero control.

Example 18. The computer-readable medium of any one of the preceding Examples, the operations further comprising decreasing a value of the regularization parameter γ to increase the adaptation parameter μ.

Example 19. The computer-readable medium of any one of the preceding Examples, wherein resetting the adaptation parameter μ to an initial value comprises resetting the regularization parameter γ to a default value.

Example 20. The computer-readable medium of any one of the preceding Examples, wherein the reset event comprises one or more of: an indication that the NMD has moved; an indication that the NMD has been disconnected from its charging station; an indication that the NMD has been re-connected to its charging station; an initial power-up event; an indication of user presence in the environment; or an indication of motion detected in the environment.

Example 21. A network microphone device (NMD) comprising: one or more microphones; one or more audio drivers; one or more processors; and data storage having instructions therein that, when executed by the one or more processors, cause the NMD to perform operations comprising: receiving a source stream of audio comprising source audio content to be played back via the one or more audio drivers; playing back, via the one or more audio drivers, the source audio content; receiving, via the one or more microphones, a captured stream of microphone input signals; generating, via an adaptive filter, a filter output using a reference signal corresponding to the source audio content and the microphone input signals, wherein generating the filter output includes applying a variable adaptation parameter that determines, at least in part, an adaptation rate of the adaptive filter; incrementing or decrementing the adaptation parameter over time based at least in part on the filter output; determining a convergence state of the adaptive filter; and based on the determined convergence state, resetting the adaptation parameter to a default value.

Example 22. The NMD of any one of the preceding Examples, wherein the convergence state is a convergence error state, and wherein resetting the adaptation parameter to the default value increases an adaptation rate of the adaptive filter.

Example 23. The NMD of any one of the preceding Examples, wherein determining the convergence state comprises determining a correlation coefficient ρ frame m, defined by the following equation:

$$\rho_{EX}[m] = \frac{|R_{EX}[m]|}{\sqrt{R_{EE}[m] \cdot R_{XX}[m] + \varepsilon}}$$

where RXX a function of the reference signal; where REE is a function of the filter output energy; where REX is a function of both the reference signal and the filter output energy; and where ε is a divide-by-zero control.

Example 24. The NMD of any one of the preceding Examples, wherein determining the convergence state comprises further comprising counting a number of frames for which the correlation coefficient exceeds a predetermined threshold.

Example 25. The NMD of any one of the preceding Examples, wherein determining the convergence state comprises generating a binary output of a convergence successful state or a convergence error state.

Example 26. The NMD of any one of the preceding Examples, wherein the adaptation parameter μ varies over time according to the function:

$$\mu = \mu_0 \frac{R_{XX}}{R_{XX}^2 + \gamma R_{EE}^2 + \varepsilon}$$

where μ0 is a constant step-size factor; where RXX is a function of the reference signal energy; where REE is a function of the filter output energy; where γ is a regularization parameter; and where ε is a divide-by-zero control.

Example 27. The NMD of any one of the preceding Examples, the operations further comprising decreasing a value of the regularization parameter γ to increase the adaptation parameter μ.

Example 28. A method comprising: receiving a source stream of audio comprising source audio content to be played back via the one or more audio drivers; playing back, via the one or more audio drivers, the source audio content; receiving, via the one or more microphones, a captured stream of microphone input signals; generating, via an adaptive filter, a filter output using a reference signal corresponding to the source audio content and the microphone input signals, wherein generating the filter output includes applying a variable adaptation parameter that determines, at least in part, an adaptation rate of the adaptive filter; incrementing or decrementing the adaptation parameter over time based at least in part on the filter output; determining a convergence state of the adaptive filter; and based on the determined convergence state, resetting the adaptation parameter to a default value.

Example 29. The method of any one of the preceding Examples, wherein the convergence state is a convergence error state, and wherein resetting the adaptation parameter to the default value increases an adaptation rate of the adaptive filter.

Example 30. The method of any one of the preceding Examples, wherein determining the convergence state comprises determining a correlation coefficient ρ for frame m, defined by the following equation:

$$\rho_{EX}[m] = \frac{|R_{EX}[m]|}{\sqrt{R_{EE}[m] \cdot R_{XX}[m] + \varepsilon}}$$

where RXX is a function of the reference signal energy; where REE is a function of the filter output energy; where REX is a function of both the reference signal and the filter output energy; where γ is a regularization parameter; and where ε is a divide-by-zero control.

Example 31. The method of any one of the preceding Examples, wherein determining the convergence state comprises further comprising counting a number of frames for which the correlation coefficient exceeds a predetermined threshold.

Example 32. The method of any one of the preceding Examples, wherein determining the convergence state comprises generating a binary output of a convergence successful state or a convergence error state.

Example 33. The method of any one of the preceding Examples, wherein the adaptation parameter μ varies over time according to the function:

$$\mu = \mu_0 \frac{R_{XX}}{R_{XX}^2 + \gamma R_{EE}^2 + \varepsilon}$$

where μ0 is a constant step-size factor; where RXX is a function of the reference signal energy; where REE is a function of the filter output energy; where γ is a regularization parameter; and where ε is a divide-by-zero control.

Example 34. The method of any one of the preceding Examples, the operations further comprising decreasing a value of the regularization parameter γ to increase the adaptation parameter μ.

Example 35. A tangible, non-transitory computer-readable medium storing instructions that, when executed by one or more processors of a network microphone device (NMD), cause the NMD to perform operations comprising: receiving a source stream of audio comprising source audio content to be played back via the one or more audio drivers; playing back, via the one or more audio drivers, the source audio content; receiving, via the one or more microphones, a captured stream of microphone input signals; generating, via an adaptive filter, a filter output using a reference signal corresponding to the source audio content and the microphone input signals, wherein generating the filter output includes applying a variable adaptation parameter that determines, at least in part, an adaptation rate of the adaptive filter; incrementing or decrementing the adaptation parameter over time based at least in part on the filter output; determining a convergence state of the adaptive filter; and based on the determined convergence state, resetting the adaptation parameter to a default value.

Example 36. The computer-readable medium of any one of the preceding Examples, wherein the convergence state is a convergence error state, and wherein resetting the adaptation parameter to the default value increases an adaptation rate of the adaptive filter.

Example 37. The computer-readable medium of any one of the preceding Examples, wherein determining the convergence state comprises determining a correlation coefficient ρ for frame m, defined by the following equation:

$$\rho_{EX}[m] = \frac{|R_{EX}[m]|}{\sqrt{R_{EE}[m] \cdot R_{XX}[m] + \varepsilon}}$$

where RXX is a function of the reference signal energy; where REE is a function of the filter output energy; where REX is a function of both the reference signal and the filter output energy; where γ is a regularization parameter; and where ε is a divide-by-zero control.

Example 38. The computer-readable medium of any one of the preceding Examples, wherein determining the convergence state comprises further comprising counting a number of frames for which the correlation coefficient exceeds a predetermined threshold.

Example 39. The computer-readable medium of any one of the preceding Examples, wherein the adaptation parameter μ varies over time according to the function:

$$\mu = \mu_0 \frac{R_{XX}}{R_{XX}^2 + \gamma R_{EE}^2 + \varepsilon}$$

where μ0 is a constant step-size factor; where RXX is a function of the reference signal energy; where REE is a function of the filter output energy; where γ is a regularization parameter; and where ε is a divide-by-zero control.

Example 40. The computer-readable medium of any one of the preceding Examples, the operations further comprising decreasing a value of the regularization parameter γ to increase the adaptation parameter μ.

The invention claimed is:

1. A network microphone device (NMD) comprising:

one or more microphones;

one or more audio drivers;

one or more processors; and data storage having instructions therein that, when executed by the one or more processors, cause the NMD to perform operations comprising:

receiving a source stream of audio comprising source audio content to be played back via the one or more audio drivers;

playing back, via the one or more audio drivers, the source audio content;

receiving, via the one or more microphones, a captured stream of microphone input signals;

generating, via an adaptive filter, a filter output to be applied to the microphone input signals, the filter output generated using a reference signal corresponding to the source audio content and the microphone input signals, wherein the adaptive filter H for a given frame m is dynamically updated according to the equation:

$$H(m) = H(m-1) + U(m)$$

where U(m) is an update function having a variable adaptation parameter;

incrementing or decrementing the adaptation parameter over time based at least in part on the filter output;

determining that a reset event has occurred, wherein the reset event comprises an indication that the NMD has moved; and after determining that the reset event has occurred, resetting the adaptation parameter to a default value.

2. The NMD of claim 1, wherein resetting the adaptation parameter to a default value increases an adaptation rate of the adaptive filter.

3. The NMD of claim 1, wherein the adaptation parameter μ varies over time according to the function:

$$\mu = \mu_0 \frac{R_{XX}}{R_{XX}^2 + \gamma R_{EE}^2 + \varepsilon}$$

where $\mu_0$ is a constant step size factor;

where $R_{XX}$ is a function of the reference signal energy;

where $R_{EE}$ is a function of the filter output energy;

where γ is a regularization parameter; and where ε is a divide-by-zero control.

4. The NMD of claim 3, the operations further comprising decreasing a value of the regularization parameter γ to increase the adaptation parameter μ.

5. The NMD of claim 3, wherein resetting the adaptation parameter μ to a default value comprises resetting the regularization parameter γ to a default value.

6. The NMD of claim 1, wherein the operations further comprise:

applying the filter output to the microphone input signals to generate filtered microphone signals; and using the filtered microphone signals to detect a voice input.

7. The NMD of claim 1, wherein the indication that the NMD has moved is determined based on at least one of: (i) output from an accelerometer; or (ii) a change in a charging state of the NMD.

8. A method comprising:

receiving, at a network microphone device (NMD), a source stream of audio comprising source audio content to be played back via one or more audio drivers of the NMD;

playing back, via the NMD, the source audio content;

receiving, via one or more microphones of the NMD, a captured stream of microphone input signals;

generating, via an adaptive filter of the NMD, a filter output to be applied to the microphone input signals, the filter output generated using a reference signal corresponding to the source audio content and the microphone input signals, wherein the adaptive filter H for a given frame m is dynamically updated according to the equation:

$$H(m) = H(m-1) + U(m)$$

where U(m) is an update function having a variable adaptation parameter;

incrementing or decrementing the adaptation parameter over time based at least in part on the filter output;

determining that a reset event has occurred, wherein the reset event comprises an indication that the NMD has moved; and after determining that the reset event has occurred, resetting the adaptation parameter to a default value.

9. The method of claim 8, wherein resetting the adaptation parameter to a default value increases an adaptation rate of the adaptive filter.

10. The method of claim 8, wherein the adaptation parameter μ varies over time according to the function:

$$\mu = \mu_0 \frac{R_{XX}}{R_{XX}^2 + \gamma R_{EE}^2 + \varepsilon}$$

where $\mu_0$ is a constant step-size factor;
where $R_{XX}$ is a function of the reference signal energy;
where $R_{EE}$ is a function of the filter output energy;
where γ is a regularization parameter; and
where ε is a divide-by-zero control.

11. The method of claim 10, further comprising decreasing a value of the regularization parameter γ to increase the adaptation parameter μ.

12. The method of claim 10, wherein resetting the adaptation parameter μ to a default value comprises resetting the regularization parameter γ to a default value.

13. The method of claim 8, further comprising:
applying the filter output to the microphone input signals to generate filtered microphone signals; and
using the filtered microphone signals to detect a voice input.

14. The method of claim 8, wherein the indication that the NMD has moved is determined based on at least one of: (i) output from an accelerometer; or (ii) a change in a charging state of the NMD.

15. A tangible, non-transitory, computer-readable medium storing instructions that, when executed by one or more processors of a network microphone device (NMD), cause the NMD to perform operations comprising:
receiving, at the NMD, a source stream of audio comprising source audio content to be played back via one or more audio drivers of the NMD;
playing back, via the NMD, the source audio content;
receiving, via one or more microphones of the NMD, a captured stream of microphone input signals;
generating, via an adaptive filter of the NMD, a filter output to be applied to the microphone input signals, the filter output generated using a reference signal corresponding to the source audio content and the microphone input signals, wherein the adaptive filter H for a given frame m is dynamically updated according to the equation:

$$H(m) = H(m-1) + U(m)$$

where U(m) is an update function having a variable adaptation parameter;
incrementing or decrementing the adaptation parameter over time based at least in part on the filter output;
determining that a reset event has occurred, wherein the reset event comprises an indication that the NMD has moved; and
after determining that the reset event has occurred, resetting the adaptation parameter to a default value.

16. The computer-readable medium of claim 15, wherein resetting the adaptation parameter to a default value increases an adaptation rate of the adaptive filter.

17. The computer-readable medium of claim 15, wherein the adaptation parameter μ varies over time according to the function:

$$\mu = \mu_0 \frac{R_{XX}}{R_{XX}^2 + \gamma R_{EE}^2 + \varepsilon}$$

where $\mu_0$ is a constant step-size factor;
where $R_{XX}$ is a function of the reference signal energy;
where $R_{EE}$ is a function of the filter output energy;
where γ is a regularization parameter; and
where ε is a divide-by-zero control.

18. The computer-readable medium of claim 17, the operations further comprising decreasing a value of the regularization parameter γ to increase the adaptation parameter μ.

19. The computer-readable medium of claim 17, wherein resetting the adaptation parameter μ to a default value comprises resetting the regularization parameter γ to a default value.

20. The computer-readable medium of claim 15, wherein the indication that the NMD has moved is determined based on at least one of: (i) output from an accelerometer; or (ii) a change in a charging state of the NMD.

* * * * *